(12) United States Patent
Martin et al.

(10) Patent No.: US 10,834,673 B2
(45) Date of Patent: Nov. 10, 2020

(54) TELECOMMUNICATIONS APPARATUS AND METHODS

(71) Applicant: Sony Corporation, Tokyo (JP)

(72) Inventors: Brian Alexander Martin, Basingstoke (GB); Martin Warwick Beale, Basingstoke (GB); Shin Horng Wong, Basingstoke (GB); Shinichiro Tsuda, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 122 days.

(21) Appl. No.: 15/771,526

(22) PCT Filed: Oct. 14, 2016

(86) PCT No.: PCT/EP2016/074766
§ 371 (c)(1),
(2) Date: Apr. 27, 2018

(87) PCT Pub. No.: WO2017/076610
PCT Pub. Date: May 11, 2017

(65) Prior Publication Data
US 2018/0352511 A1 Dec. 6, 2018

(30) Foreign Application Priority Data
Nov. 5, 2015 (EP) .................................... 15193159

(51) Int. Cl.
*H04W 52/02* (2009.01)
*H04W 72/04* (2009.01)

(52) U.S. Cl.
CPC ... *H04W 52/0229* (2013.01); *H04W 52/0212* (2013.01); *H04W 52/0216* (2013.01);
(Continued)

(58) Field of Classification Search
None
See application file for complete search history.

(56) References Cited

U.S. PATENT DOCUMENTS

2003/0236085 A1* 12/2003 Ho ..................... H04W 74/0833
455/411
2009/0239566 A1* 9/2009 Pelletier .............. H04W 56/005
455/517
(Continued)

FOREIGN PATENT DOCUMENTS

WO  WO 2014/024175 A2  2/2014
WO  WO 2015/019454 A1  2/2015

OTHER PUBLICATIONS

International Search Report dated Jan. 3, 2017, in PCT/EP2016/074766, filed Oct. 14, 2016.
(Continued)

*Primary Examiner* — Ruihua Zhang
(74) *Attorney, Agent, or Firm* — Xsensus LLP

(57) ABSTRACT

A method of operating a terminal device in a wireless telecommunications system is disclosed. The terminal device is configured to selectively switch between an active operating mode and a reduced-power operating mode. The method comprises communicating with a network entity to exchange a block of data between the terminal device and the network entity while the terminal device is in the active operating mode. The method further comprises determining when communications associated with the exchange of the block of data are complete, and in response to determining communications associated with the exchange of the block of data are complete, switching from the active operating mode to the reduced-power operating mode.

20 Claims, 10 Drawing Sheets

(52) U.S. Cl.
CPC ..... *H04W 52/0235* (2013.01); *H04W 72/048* (2013.01); *Y02D 70/1242* (2018.01); *Y02D 70/1262* (2018.01); *Y02D 70/21* (2018.01); *Y02D 70/24* (2018.01)

(56) References Cited

U.S. PATENT DOCUMENTS

| | | | |
|---|---|---|---|
| 2012/0033597 A1* | 2/2012 | Kim | H04W 72/0413 370/311 |
| 2012/0275364 A1 | 11/2012 | Anderson et al. | |
| 2012/0275365 A1 | 11/2012 | Anderson et al. | |
| 2012/0275366 A1 | 11/2012 | Anderson et al. | |
| 2012/0327833 A1* | 12/2012 | Kim | H04W 76/28 370/311 |
| 2014/0153460 A1* | 6/2014 | Shrivastava | H04W 52/0225 370/311 |
| 2015/0043481 A1* | 2/2015 | Mucke | H04L 1/1854 370/329 |
| 2015/0271755 A1 | 9/2015 | Karri et al. | |
| 2018/0020365 A1* | 1/2018 | Xiong | H04W 74/0833 |

OTHER PUBLICATIONS

"Digital cellular telecommunications system (Phase 2+); Universal Mobile Telecommunications System (UMTS); LTE; Service requirements for Machine-Type Communications (MTC); Stage 1", ETSI TS 122 368 V12.4.0, Oct. 2014, 23 pages.

Holma, H. et al., "LTE for UMTS OFDMA and SC-FDMA based radio access", 2009, 8 pages.

"LTE; Evolved Universal Terrestrial Radio Access (E-UTRA); Radio Resource Control (RRC); Protocol specification", ETSI TS 136 331 V12.7.0, Oct. 2015, 455 pages.

"LTE; Evolved Universal Terrestrial Radio Access (E-UTRA); Medium Access Control (MAC) protocol specification", ETSI TS 136 321 V12.7.0, Oct. 2015, 79 pages.

Qualcomm Incorporated et al., "Design considerations for extended DRX in LTE", R2-152342, 3GPP TSG-RAN WG2 Meeting #90bis, May 25-29, 2015, 6 pages.

"LTE; Evolved Universal Terrestrial Radio Access (E-UTRA); Radio Link Control (RLC) protocol specification" ETSI TS 136 322 V12.2.0, Apr. 2015, 43 pages.

Ericsson, "Revised WI: Further LTE Physical Layer Enhancements for MTC", RP-150492, 3GPP TSG RAN Meeting #67, Mar. 9-12, 2015, 8 pages.

Qualcomm Incorporated, "New WI Proposal: RAN enhancements for extended DRX in LTE", RP-150493, 3GPP TSG RAN Meeting #67, Mar. 9-12, 2015, 7 pages.

Qualcomm Incorporated, "New Work Item: NarrowBand IOT (NB-IOT)", RP-151621, 3GPP RSG RAN Meeting #69, Sep. 14-16, 2015, 8 pages.

* cited by examiner

UE moves to DRX when it receives HARQ ACK related to last PDU

TELECOMMUNICATIONS APPARATUS AND METHODS

BACKGROUND

Field

The present disclosure relates to telecommunications apparatus and methods.

Description of Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

Third and fourth generation mobile telecommunication systems, such as those based on the 3GPP defined UMTS and Long Term Evolution (LTE) architectures, are able to support more sophisticated services than simple voice and messaging services offered by previous generations of mobile telecommunication systems.

For example, with the improved radio interface and enhanced data rates provided by LTE systems, a user is able to enjoy high data rate applications such as mobile video streaming and mobile video conferencing that would previously only have been available via a fixed line data connection. The demand to deploy third and fourth generation networks is therefore strong and the coverage areas for these networks is expected to increase rapidly.

The anticipated widespread deployment of third and fourth generation networks has led to the parallel development of devices and applications which, rather than taking advantage of the high data rates available, instead take advantage of the robust radio interface and increasing ubiquity of the coverage area. Examples include so-called machine type communication (MTC) applications, which are typified by semi-autonomous or autonomous wireless communication devices (i.e. MTC devices) communicating small amounts of data on a relatively infrequent basis. Examples include so-called smart meters which, for example, might be located in a customer's house and periodically transmit information back to a central MTC server relating to the customer's consumption of a utility, such as gas, water, electricity and so on. Further information on characteristics of MTC-type devices can be found, for example, in the corresponding standards, such as ETSI TS 122 368 V12.4.0 (2014-10)/3GPP TS 22.368 version 12.4.0 Release 12 [1]. Some typical characteristics of MTC type terminal devices/MTC type data might include, for example, characteristics such as low mobility, high delay tolerance, small data transmissions, a level of predictability for traffic usage and timing (i.e. traffic profile), relatively infrequent transmissions and group-based features, policing and addressing.

Unlike a conventional third or fourth generation terminal device (such as a smartphone), an MTC-type terminal is preferably relatively simple and inexpensive and able to operate with relatively low power consumption. For example, it may often be the case that an MTC-type terminal is required to operate for an extended period of time without an external source of power. However, whilst it can be convenient for an MTC-type terminal to take advantage of the wide coverage area and robust communications interface provided by third or fourth generation mobile telecommunication networks, there are aspects of these networks which are not well suited to simple and inexpensive devices. This is because such networks are generally optimised for use by devices that require high data rates and low latency. Although power usage is an important consideration for such devices, it is to some extent of secondary concern to issues of data rates and latency. The type of functions performed by a typical MTC-type terminal on the other hand (for instance collecting and reporting back data on a relatively infrequent basis) do not typically require high data rates furthermore are typically not time-critical.

With this in mind, the inventors have recognised a desire for methods and apparatus that allow terminal device to operate within a mobile telecommunications network with reduced power consumption as compared to existing approaches.

SUMMARY

The present disclosure can help address or mitigate at least some of the issues discussed above.

Respective aspects and features of the present disclosure are defined in the appended claims.

It is to be understood that both the foregoing general description and the following detailed description are exemplary, but are not restrictive, of the present technology. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts throughout the several views, and wherein.

DETAILED DESCRIPTION OF THE EMBODIMENTS

Figure 1:
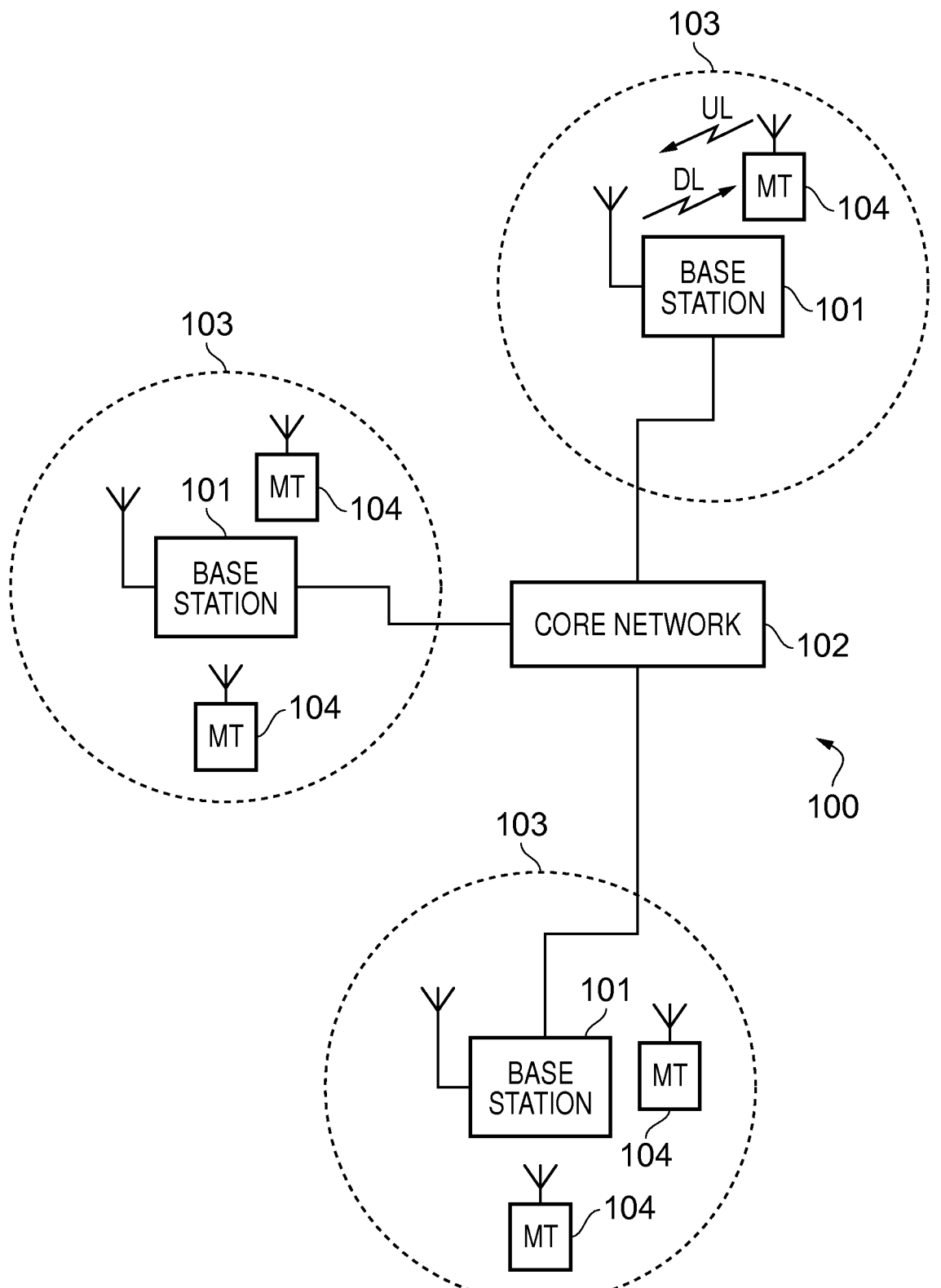
FIG. 1 schematically represents an example of a conventional LTE-type wireless telecommunication network.

FIG. 1 provides a schematic diagram illustrating some basic functionality of a mobile telecommunications network/system 100 operating in accordance with LTE principles and which may be adapted to implement embodiments of the disclosure as described further below. Various elements of FIG. 1 and their respective modes of operation are well-known and defined in the relevant standards administered by the 3GPP® body, and also described in many books on the subject, for example, Holma H. and Toskala A [2]. It will be appreciated that operational aspects of the telecommunications network which are not specifically described below may be implemented in accordance with any known techniques, for example according to the relevant standards.

The network 100 includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The core network 102 routes data to and from the terminal devices 104 via the respective base stations 101 and provides functions such as authentication, mobility management, charging and so on. Terminal devices may also be referred to as mobile stations, user equipment (UE), user terminal, mobile radio, communications device, and so forth. Base stations, which are an example of network infrastructure equipment, may also be referred to as transceiver stations/nodeBs/e-nodeBs, and so forth.

Figure 2:
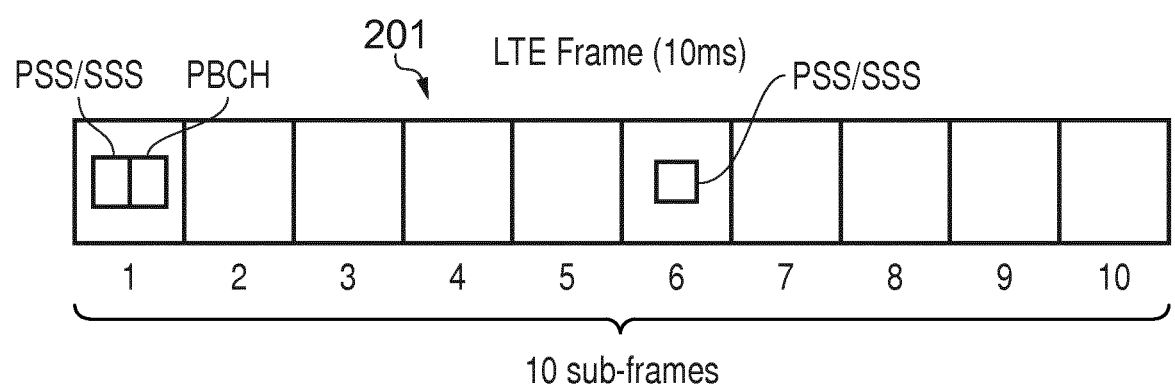
FIG. 2 schematically represents some aspects of a conventional LTE radio frame structure.

Mobile telecommunications systems such as those arranged in accordance with the 3GPP defined Long Term Evolution (LTE) architecture use an orthogonal frequency division modulation (OFDM) based interface for the radio downlink (so-called OFDMA) and a single carrier frequency division multiple access scheme (SC-FDMA) on the radio uplink. FIG. 2 shows a schematic diagram illustrating an OFDM based LTE downlink radio frame 201. The LTE downlink radio frame is transmitted from a LTE base station (known as an enhanced Node B) and lasts 10 ms. The downlink radio frame comprises ten subframes, each subframe lasting 1 ms. A primary synchronisation signal (PSS) and a secondary synchronisation signal (SSS) are transmitted in the first and sixth subframes of the LTE frame. A physical broadcast channel (PBCH) is transmitted in the first subframe of the LTE frame.

Figure 3:
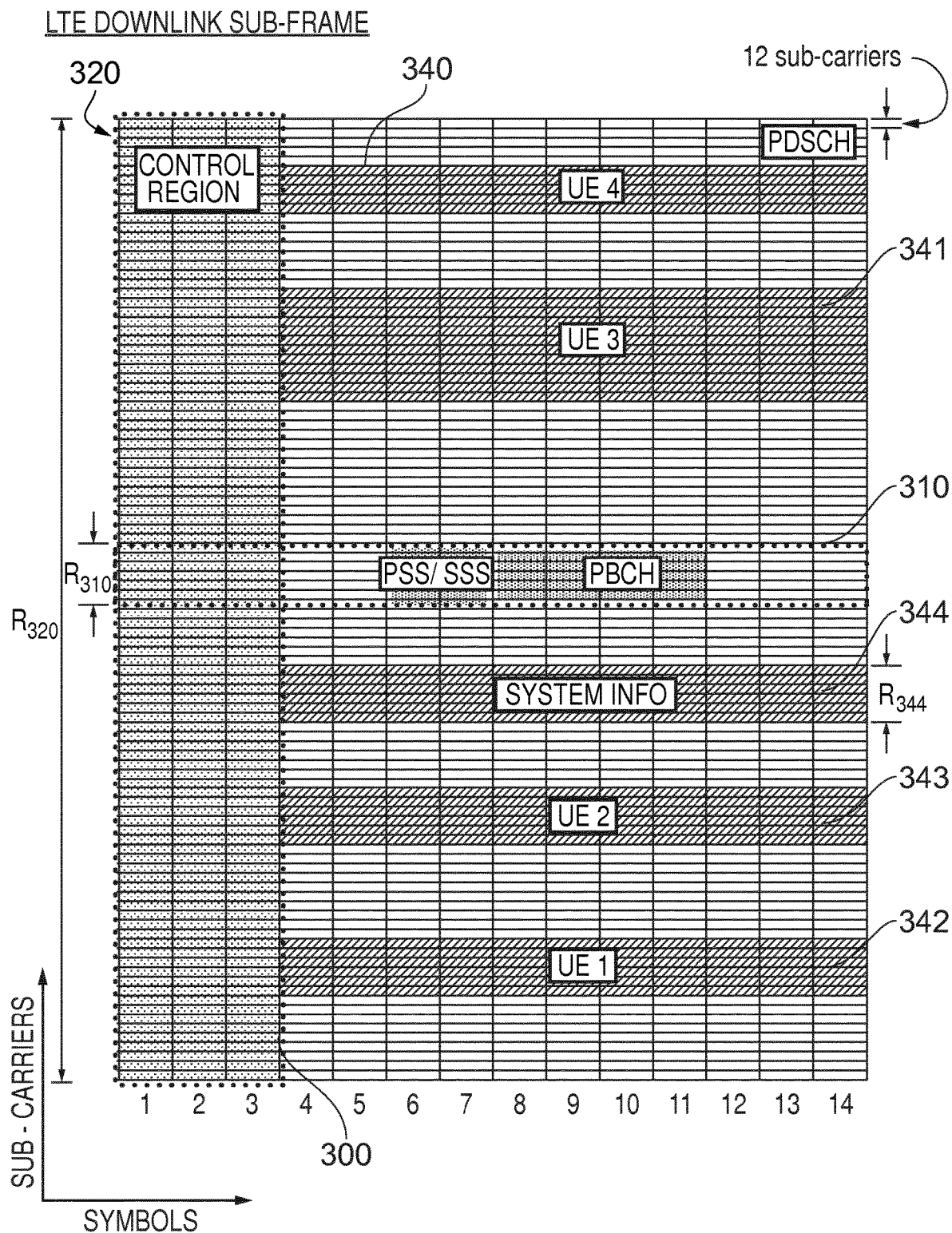
FIG. 3 schematically represents some aspects of a conventional LTE downlink radio subframe.

FIG. 3 is a schematic diagram of a grid which illustrates the structure of an example conventional downlink LTE subframe. The subframe comprises a predetermined number of symbols which are transmitted over a 1 ms period. Each symbol comprises a predetermined number of orthogonal subcarriers distributed across the bandwidth of the downlink radio carrier.

The example subframe shown in FIG. 3 comprises 14 symbols and 1200 subcarriers spread across a 20 MHz bandwidth licensed for use by the operator of the network 100, and this example is the first subframe in a frame (hence it contains PBCH). The smallest allocation of physical resource for transmission in LTE is a resource block comprising twelve subcarriers transmitted over one subframe. For clarity, in FIG. 3, each individual resource element is not shown, instead each individual box in the subframe grid corresponds to twelve subcarriers transmitted on one symbol.

FIG. 3 shows in hatching resource allocations for four LTE terminals 340, 341, 342, 343. For example, the resource allocation 342 for a first LTE terminal (UE 1) extends over five blocks of twelve subcarriers (i.e. 60 subcarriers), the resource allocation 343 for a second LTE terminal (UE2) extends over six blocks of twelve subcarriers (i.e. 72 subcarriers), and so on.

Control channel data can be transmitted in a control region 300 (indicated by dotted-shading in FIG. 3) of the subframe comprising the first "n" symbols of the subframe where "n" can vary between one and three symbols for channel bandwidths of 3 MHz or greater and where "n" can vary between two and four symbols for a channel bandwidth of 1.4 MHz. For the sake of providing a concrete example, the following description relates to host carriers with a channel bandwidth of 3 MHz or greater so the maximum value of "n" will be 3 (as in the example of FIG. 3). The data transmitted in the control region 300 includes data transmitted on the physical downlink control channel (PDCCH), the physical control format indicator channel (PCFICH) and the physical HARQ indicator channel (PHICH). These channels transmit physical layer control information. Control channel data can also or alternatively be transmitted in a second region of the subframe comprising a number of subcarriers for a time substantially equivalent to the duration of the subframe, or substantially equivalent to the duration of the subframe remaining after the "n" symbols. The data transmitted in this second region is transmitted on the enhanced physical downlink control channel (EPDCCH). This channel transmits physical layer control information which may be in addition to that transmitted on other physical layer control channels.

PDCCH and EPDCCH contain control data indicating which subcarriers of the subframe have been allocated to specific terminals (or all terminals or subset of terminals). This may be referred to as physical-layer control signalling/data. Thus, the PDCCH and/or EPDCCH data transmitted in the control region 300 of the subframe shown in FIG. 3 would indicate that UE1 has been allocated the block of resources identified by reference numeral 342, that UE2 has been allocated the block of resources identified by reference numeral 343, and so on.

PCFICH contains control data indicating the size of the control region (i.e. between one and three symbols for channel bandwidths of 3 MHz or greater and between two and four symbols for channel bandwidths of 1.4 MHz).

PHICH contains HARQ (Hybrid Automatic Request) data indicating whether or not previously transmitted uplink data has been successfully received by the network.

Symbols in a central band 310 of the time-frequency resource grid are used for the transmission of information including the primary synchronisation signal (PSS), the secondary synchronisation signal (SSS) and the physical broadcast channel (PBCH). This central band 310 is typically 72 subcarriers wide (corresponding to a transmission bandwidth of 1.08 MHz). The PSS and SSS are synchronisation signals that once detected allow a LTE terminal device to achieve frame synchronisation and determine the physical layer cell identity of the enhanced Node B transmitting the downlink signal. The PBCH carries information about the cell, comprising a master information block (MIB) that includes parameters that LTE terminals use to properly access the cell. Data transmitted to terminals on the physical downlink shared channel (PDSCH), which may also be referred to as a downlink data channel, can be transmitted in other resource elements of the subframe. In general PDSCH conveys a combination of user-plane data and non-physical layer control-plane data (such as Radio Resource Control (RRC) and Non Access Stratum (NAS) signalling). The user-plane data and non-physical layer control-plane data conveyed on PDSCH may be referred to as higher layer data (i.e. data associated with a layer higher than the physical layer).

FIG. 3 also shows a region of PDSCH containing system information and extending over a bandwidth of R344. A conventional LTE subframe will also include reference signals which are not shown in FIG. 3 in the interests of clarity.

The number of subcarriers in a LTE channel can vary depending on the configuration of the transmission network. Typically this variation is from 72 sub carriers contained within a 1.4 MHz channel bandwidth to 1200 subcarriers contained within a 20 MHz channel bandwidth (as schematically shown in FIG. 3). As is known in the art, data transmitted on the PDCCH, PCFICH and PHICH is typically distributed on the subcarriers across the entire bandwidth of the subframe to provide for frequency diversity.

A terminal device in radio resource control (RRC) connected mode receives and decodes PDCCH in subframes to identify if there are any transmission resource allocations (resource grants) for the terminal device in the subframe. A terminal device is thus conventionally required to receive and decode PDCCH for all subframes in which the terminal device might potentially be allocated transmission resources, even though in many of these subframes there might not be any data for the terminal device. Resources used in receiving and decoding PDCCH in subframes for which there is no data for the terminal device are in effect wasted. With this in mind, a known technique for lowering power consumption in LTE-type terminals is to restrict the number of subframes for which a terminal device should monitor PDCCH using so-called discontinuous reception, DRX, techniques. DRX techniques involve a terminal device and a base station in effect agreeing times (e.g. particular subframes) during which the terminal device will be monitoring downlink physical channels and the base station can expect the terminal device to receive transmissions sent to it. The terminal device thus knows that outside these agreed times there are subframes when it will not receive transmissions from the base station, and the terminal device may conserve power during these subframes by not receiving and decoding PDCCH.

Thus, a DRX mode comprises alternating periods during which a terminal device could potentially receive data from the base station (and hence should monitor PDCCH) and periods during which the terminal device will not receive data (and hence need not monitor PDCCH to save power). The subframes in which the terminal device could receive data from the base station may be referred to as DRX inactive periods and the subframes in which the terminal device should not receive data from the base station may be referred to a DRX active periods. DRX inactive periods may also be referred to as wake periods or non-dormant periods and DRX active periods may also be referred to sleep periods or dormant periods. The process of transitioning from a DRX active (sleep/dormant) mode of operation to a DRX inactive (wake/non-dormant) mode of operation may be referred to as waking-up. Similarly, the process of transitioning from a DRX inactive (wake/non-dormant) mode of operation to a DRX active (sleep/dormant) mode of operation may be referred to as going to sleep. Thus, a terminal device operating in a DRX inactive mode may be referred to as being awake and a terminal device operating in a DRX active mode may be referred to as being asleep.

In a conventional LTE network the timings of DRX inactive periods and DRX active periods for a given terminal device in RRC Connected mode are defined by various parameters (which may be defined in terms of numbers of subframes). There are six basic DRX parameters that define the pattern of DRX inactive and DRX active periods in LTE (i.e. the times of transitions between these two DRX operating modes). These are:
 (i) DRX Cycle
 (ii) On Duration Timer
 (iii) DRX Short Cycle
 (iv) DRX Short Cycle Timer
 (v) DRX Inactivity Timer
 (vi) DRX Retransmission Timer FIGS. 4 to 7 are schematic diagrams showing how the above-identified DRX parameters are defined on a representative time axis t. (The timings in these figures are represented for clarity of explanation and are not necessarily shown to scale.)

Figure 4:
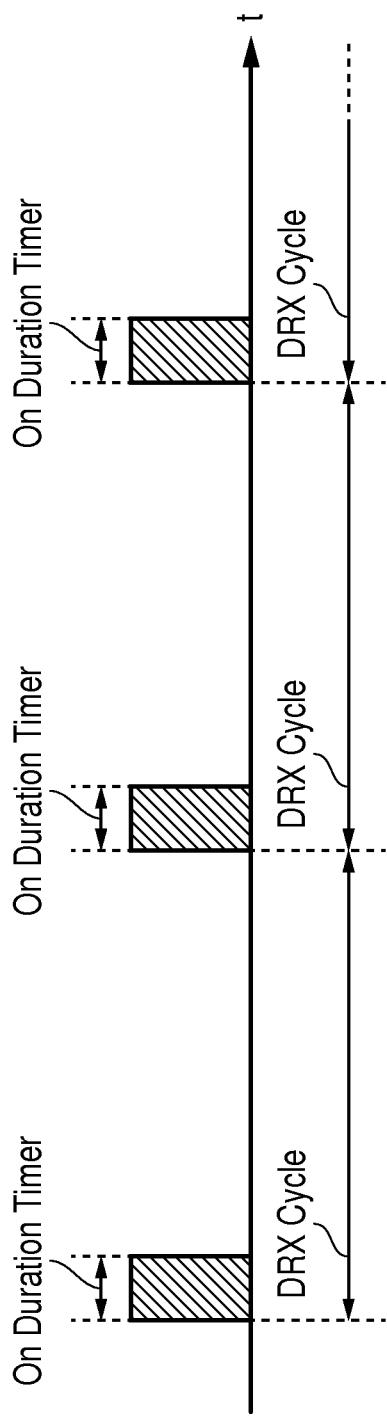
FIGS. 4 to 6 schematically represent some aspects of a conventional discontinuous reception (DRX) mode of a wireless telecommunication network.

FIG. 4 schematically represents the basic underlying DRX cycle with periods when the terminal device receiver circuitry is active (awake) and monitoring PDCCH (DRX inactive mode) schematically represented by diagonally shaded blocks on the time axis t. This aspect of the LTE DRX mode may be referred to herein as the "normal" or "basic" DRX cycle/mode. The timings relating to this normal DRX cycle are set by the parameters DRX Cycle and On Duration Timer as schematically represented in the figure. Thus, in the normal DRX mode a terminal device activates its receiver circuitry and monitors PDCCH for a period corresponding to On Duration Timer once every DRX Cycle.

A relatively long basic DRX cycle allows for more power to be conserved. However, a long basic DRX cycle also results in increased latency because there are longer periods of time during which the terminal device is not monitoring PDCCH (and hence cannot be contacted). To address this LTE provides for two durations of DRX cycle, namely the basic/normal DRX cycle represented in FIG. 4, and a shorter DRX cycle. The short DRX cycle is broadly similar to the normal DRX cycle in overall structure in that it also comprises a regular pattern of DRX inactive and DRX active periods. However, the short DRX cycle adopts a shorter repeat period. The operation of the short DRX cycle is governed by the parameters DRX Short Cycle and DRX Short Cycle Timer. DRX Short Cycle is the repeat period for the short DRX cycle (DRX Cycle is an integer multiple of DRX Short Cycle in LTE). DRX Short Cycle timer defines the number of short DRX cycle periods before the normal DRX cycle is entered. (In LTE the On Duration Timer applies for both short and normal DRX cycles.)

Thus a terminal device which has concluded communicating with a network follows the short DRX cycle mode of operation before entering the longer/normal DRX cycle mode (assuming no communications are made during the period established by DRX Short cycle Timer). The principle underlying this approach in LTE is a recognition that a terminal device is more likely to need to re-communicate with a network relatively soon after a previous communication, and so a shorter DRX cycle can be used to reduce latency for a period after a recent communication. If, however, the terminal device does not re-communicate with the base station during this period, the terminal device may then drop into the longer normal DRX cycle.

Figure 5:
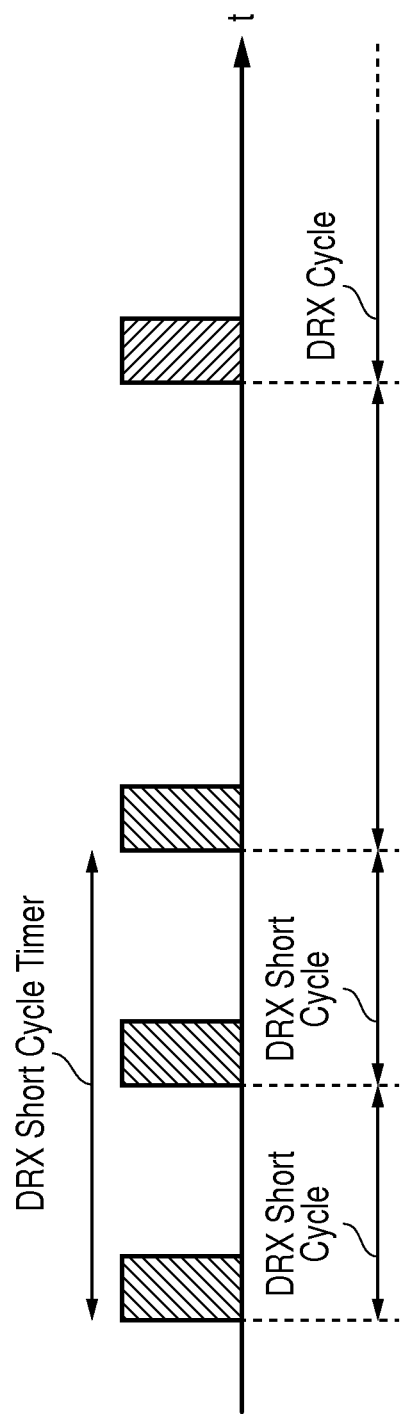

FIG. 5 schematically represents some aspects of the short DRX cycle in LTE. FIG. 5 is similar to, and will be understood from, FIG. 4, except the left-most DRX cycle in FIG. 4 is replaced in FIG. 5 with a section of short DRX cycle mode. In the example of FIG. 5 the DRX Short Cycle is one-half the normal DRX Cycle. The DRX Short Cycle Timer in this particular timing example is taken to expire at the end of the second DRX Short Cycle represented in FIG. 5 such that the normal (longer) DRX cycle, as represented in FIG. 4, picks up from this point.

In summary, in the absence of any transmissions to the terminal device or uplink scheduling requests, the DRX mode comprises a number of short cycles followed by a longer DRX opportunity until the next DRX cycle begins.

Figure 6:
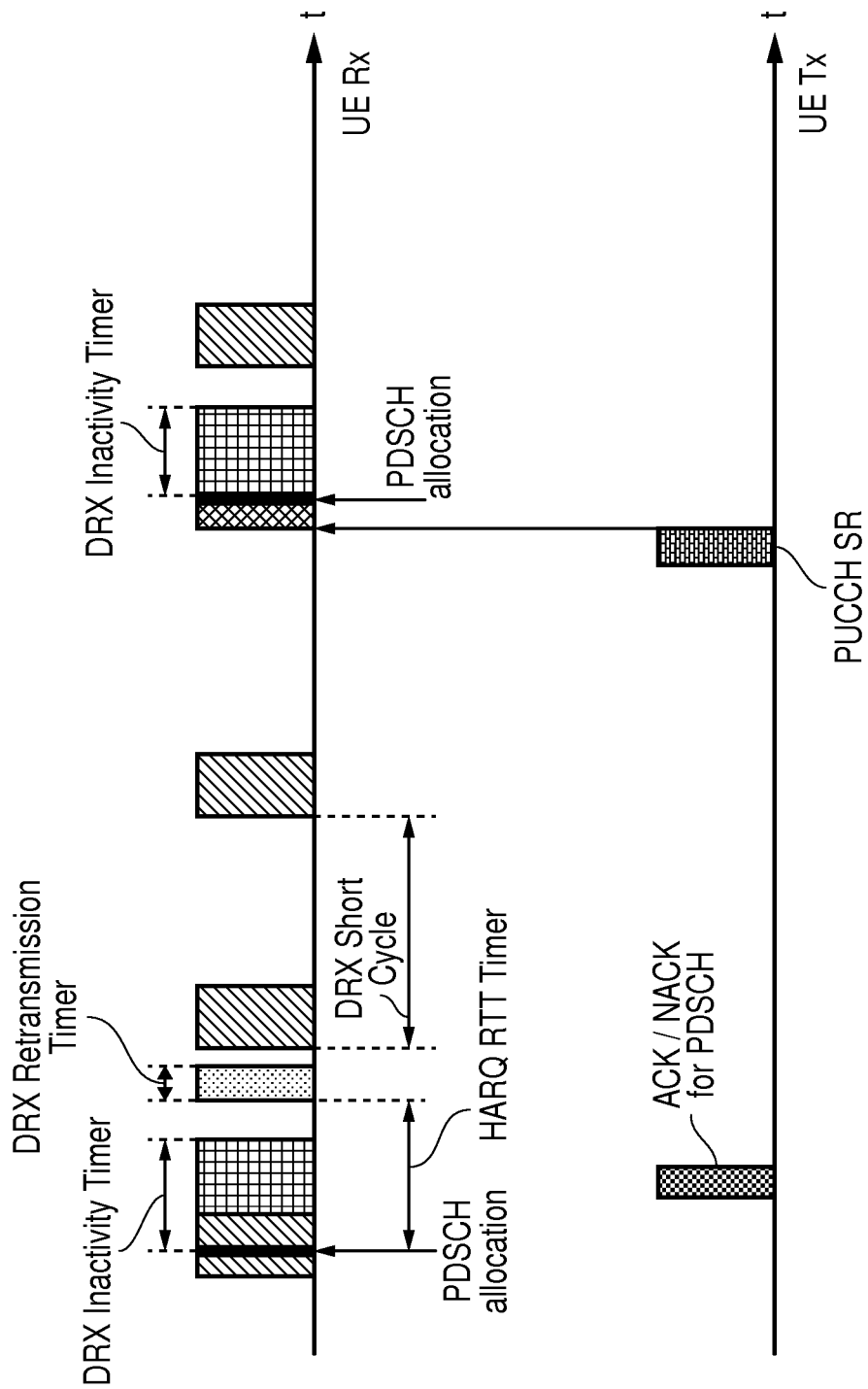

However, in addition to the regular and repeating DRX inactive periods during which a terminal device monitors PDCCH as represented in FIGS. 4 and 5, LTE defines various non-repeating/irregular DRX inactive periods during which a terminal device is required to monitor PDCCH, and these are schematically represented in FIG. 6.

The upper part of FIG. 6 is a timeline representing various periods during which a terminal device receiver is active while the lower part of FIG. 6 is a corresponding timeline representing periods during which the terminal device transmitter is active.

As with FIGS. 4 and 5, the upper part of FIG. 6 uses blocks to identify times at which the terminal device is required to monitor PDCCH.

Here it is assumed for the period of time prior to that represented in FIG. 6 the terminal device is in the normal DRX mode such as represented in FIG. 4. In the left-most DRX inactive period represented in FIG. 6 (i.e. the earliest period), the terminal device receives a downlink communication on PDSCH. This may be any conventional downlink communication and is indicated in the figure by a solid line labelled PDSCH allocation.

In LTE, the receipt of a downlink communication initiates a timer during which a terminal device is required to continue monitoring PDCCH, even if the On Duration Timer associated with the normal regular and repeating DRX cycle expires. This timer is set by the DRX Inactivity Timer parameter. Thus, the DRX Inactivity Timer causes the DRX inactive period during which the terminal device must monitor PDCCH to be extended beyond the "normal" DRX inactive period if a downlink communication is received during the "normal" DRX inactive period. This is schematically represented by the square grid shading in FIG. 6 for the leftmost DRX inactive period. If any further communications are received by the terminal device during the extended DRX inactive period, the DRX Inactivity Timer is reset, thereby extending the DRX inactive period further still. Only once the DRX Inactivity Timer expires can the terminal device re-enter DRX active mode.

In response to the PDSCH allocation represented in the left-most DRX inactive period in the upper part of FIG. 6, the terminal device will, in accordance with conventional techniques, transmit uplink acknowledgement signalling (ACK/NACK signalling) for this (schematically represented in the lower part of FIG. 6 by the chequer-board shaded block). In LTE the terminal device sends its acknowledgement signalling four subframes after the subframe containing the relevant PDSCH allocation. If the terminal device is unable to properly decode the PDSCH allocation it will transmit negative acknowledgement (NACK) signalling. In response to this the base station schedules a retransmission of the information comprising the PDSCH allocation. In LTE the base station has some flexibility with regards to rescheduling the retransmission. The base station cannot reschedule the transmission before a time set by HARQ RTT Timer (e.g. eight subframes) after the initial PDSCH allocation has expired, but the base station does not need to schedule the retransmission in the subframe immediately after HARQ RTT Timer expires.

Accordingly, if a terminal device cannot properly decode a PDSCH allocation and transmits corresponding negative acknowledgement signalling, the terminal device must reactivate its receiver circuitry when HARQ RTT Timer expires in the expectation that the base station will at some stage after HARQ RTT Timer expires schedule a retransmission of the information sent in the previous PDSCH allocation. The parameter DRX Retransmission Timer specifies the amount of time the terminal device must remain active after expiry of HARQ RTT Timer to monitor PDCCH for a resource allocation for a retransmission of the earlier PDSCH allocation that was negatively acknowledged. This period of time during which the terminal device cannot remain in DRX active mode is schematically resented in FIG. 6 by the block with dotted shading. Although not shown in FIG. 6 for the purposes of clarity, a retransmission of a previous negatively-acknowledged PDSCH allocation may be expected to occur during the period corresponding to the DRX Retransmission Timer, and this will require the terminal device to remain in an active mode monitoring PDCCH waiting for the retransmission to be received on PDSCH or for the DRX Retransmission Timer to expire.

The additional periods during which the terminal device must monitor PDCCH under the DRX Inactivity Timer (grid shading in FIG. 6) and DRX Retransmission Timer (dot shading in FIG. 6) are over and above the regular short cycle and normal cycle DRX periods. The periods associated with the regular are repeating DRX cycles therefore remains, as indicated by the diagonal shaded blocks in FIG. 6 (with the short DRX cycle mode being triggered by the PDSCH allocation).

Thus, the left-hand half of FIG. 6 represents how the repeating and regular pattern of active and inactive DRX periods of FIGS. 4 and 5 becomes disrupted when a terminal device receives downlink communications and how this result in additional periods of time during which the terminal device must monitor PDCCH.

The right-hand half of FIG. 6 represents another situation which results in a terminal device needing to monitor PDCCH outside the repeating and regular pattern of active and inactive DRX periods such as represented in FIGS. 4 and 5. This is triggered by the terminal device making a scheduling request (SR) with an uplink transmission on the physical uplink control channel (PUCCH). A terminal device will typically do this when it wishes to request uplink resources because the terminal device has data it needs to communicate to the network. The PDCCH SR is schematically represented in the lower part of FIG. 6 by the brick-shaded block.

When a terminal device transmits a SR on PUCCH it can expect to receive a response from the base station on PDSCH. In order to receive the response, the terminal device must therefore monitor PDCCH for the PDSCH allocation message. That is to say, on sending the PUCCH SR, the terminal device must exit DRX active mode. This is schematically represented in FIG. 6 by the by the block with zigzag shading. Once the terminal device receives the PDSCH allocation in response to the PUCCH SR, the DRX Inactivity Timer is restarted as discussed above, and as schematically represented in the right-hand part of the upper timeline in FIG. 6.

Thus, the right-hand half of FIG. 6 represents how the repeating and regular pattern of active and inactive DRX periods of FIGS. 4 and 5 also becomes disrupted when a terminal device requests uplink resources and how this again results in additional periods of time during which the terminal device must monitor PDCCH.

The parameters DRX Cycle, On Duration Timer, DRX Short Cycle, DRX Short Cycle Timer, DRX Inactivity Timer, and DRX Retransmission Timer which define the DRX timings are shared between the base station and terminal device through RRC signalling in accordance with conventional techniques. The starting point of the DRX cycle (i.e. what might be termed its phase relative to the system frame numbering) is determined by DRX Start Offset which is communicated through RRC signalling. Thus both the terminal device and the network can determine from the system frame number the particular subframes when the terminal device receiver should be active and listening to PDCCH. This allows the base station to schedule transmissions to the base station at the appropriate times and the terminal device to activate its receiver circuitry to receive any such transmissions at the appropriate times.

Further information on conventional DRX operation in LTE-type networks can be found in the relevant standards. See, for example, ETSI TS 136 331 12.7.0 (2015-10)/3GPP TS 36.331 version 12.7.0 Release 12 [3], and ETSI TS 136 321 V12.7.0 (2015-10)/3GPP TS 36.321 version 12.7.0 Release 12 [4].

In practice, the DRX opportunities (i.e. the times in which the terminal device need not monitor PDCCH—the DRX active periods) can be significantly less than the basic DRX cycle would suggest. This is apparent from a comparison of FIG. 6 with FIG. 4, whereby FIG. 6 shows a significant increase in the amount of time during which the terminal device must monitor PDCCH (i.e. the periods represented by the grid, dot and zigzag shaded blocks) over and above the times during which the terminal device must monitor PDCCH in accordance with the basic regular and repeating DRX cycles (i.e. the periods represented by the diagonal shaded blocks).

To increase the value of DRX mode operation for devices which transmit data infrequently it has been proposed to lengthen existing DRX timings which are currently allowed to provide for longer sleep periods. There has also been proposed what may be referred to as an extended DRX mode for devices, such as MTC devices, which transmit data infrequently (e.g. as discussed in the 3GPP document R-152342, 3GPP TSG-RAN WG2 Meeting #90bis, Fukuoka, Japan, May 25-29, 2015 [5]. The extended DRX mode may operate on longer cycle times than the short/long cycle DRX procedures in LTE and place the terminal device into an even lower power mode than the current DRX active mode (sleep mode). In this regard, the extended DRX (eDRX) mode may be conveniently referred to as a deep sleep mode. It has been proposed a terminal device in an RRC connected state and which supports the eDRX mode may transition to eDRX active mode (deep sleep) from the DRX inactive mode (awake) in response to an explicit eDRX command and may transition to eDRX active mode (deep sleep) from the DRX active mode (sleep) in response to either an explicit eDRX command or expiry of an eDRX Timer.

In accordance with existing approaches, when a terminal device finishes transmitting data to a network it cannot enter a sleep mode (reduced power mode) until it receives a communication from the network instructing the terminal device to transition to the (deep) sleep mode, for example as proposed in WO 2014/024175 [6] or until an associated timer expires.

Even with changes to existing DRX schemes to allow for longer and/or deeper sleep periods, the inventors have recognised for certain types of terminal device, such as, although not exclusively, MTC-type devices, the power costs associated with operating unnecessarily in a DRX inactive mode (i.e. awake) can represent a relatively significant increase in their power consumption. For example, a particular example MTC-type device might be expected to operate with its transceiver circuitry activated for only a second or so a day. In this case, any saving in the time during which the device remains awake (i.e. In DRX inactive mode) can represent a relatively significant saving in power consumption. In light of this, certain embodiments of the disclosure are directed to increasing the time during which a terminal device may operate in a sleep/reduced-power mode.

Figure 7:
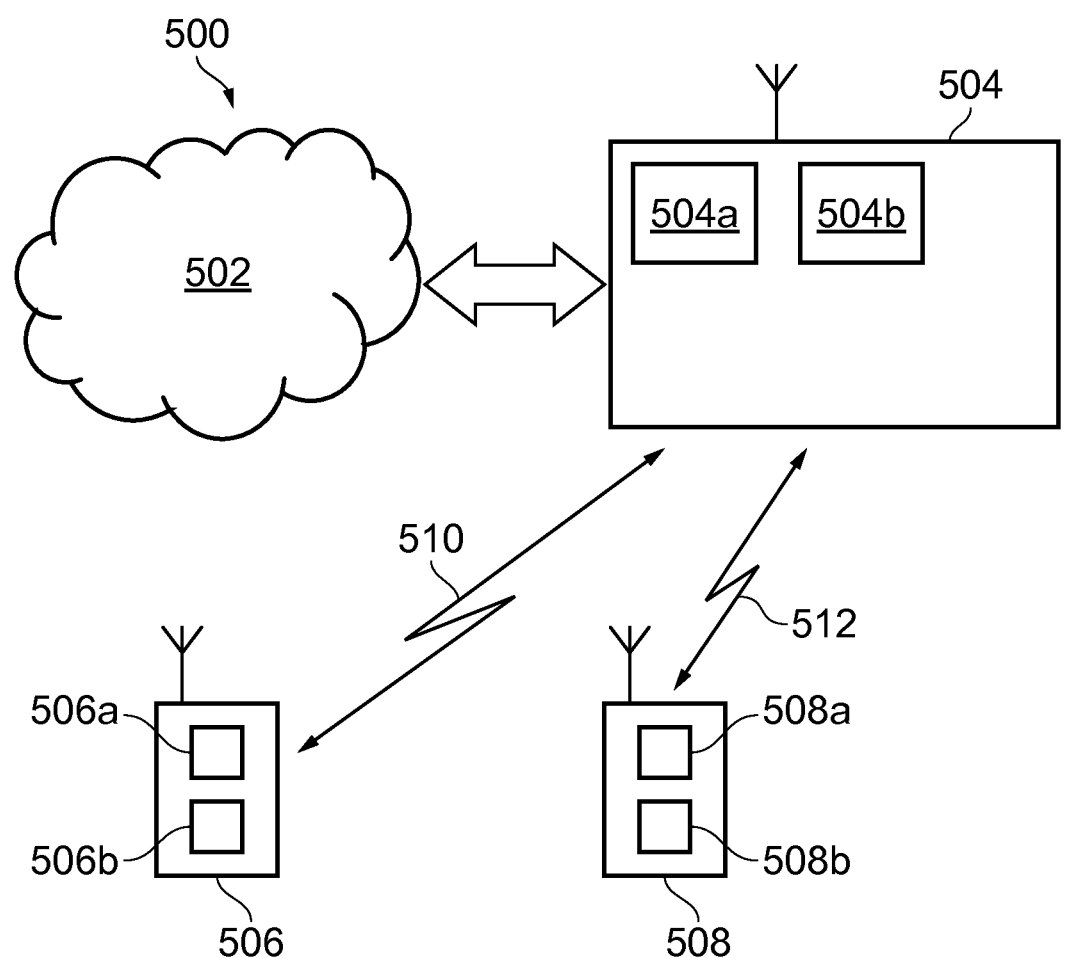
FIG. 7 schematically represents some aspects of a wireless telecommunications network configured to operate in accordance with certain embodiments of the present disclosure.

FIG. 7 schematically shows a telecommunications system 500 according to an embodiment of the present disclosure. The telecommunications system 500 in this example is based broadly around an LTE-type architecture. As such many aspects of the operation of the telecommunications system 500 are known and understood and are not described here in detail in the interest of brevity. Operational aspects of the telecommunications system 500 which are not specifically described herein may be implemented in accordance with any known techniques, for example according to the current LTE-standards.

The telecommunications system 500 comprises a core network part (evolved packet core) 502 coupled to a radio network part. The radio network part comprises a base station (evolved-nodeB) 504 coupled to a plurality of terminal devices. In this example, two terminal devices are shown, namely a first terminal device 506 and a second terminal device 508. It will of course be appreciated that in practice the radio network part may comprise a plurality of base stations serving a larger number of terminal devices across various communication cells. However, only a single base station and two terminal devices are shown in FIG. 7 in the interests of simplicity.

As with a conventional mobile radio network, the terminal devices 506, 508 are arranged to communicate data to and from the base station (transceiver station) 504. The base station is in turn communicatively connected to a serving gateway, S-GW, (not shown) in the core network part which is arranged to perform routing and management of mobile communications services to the terminal devices in the telecommunications system 500 via the base station 504. In order to maintain mobility management and connectivity, the core network part 502 also includes a mobility management entity (not shown) which manages the enhanced packet service, EPS, connections with the terminal devices 506, 508 operating in the communications system based on subscriber information stored in a home subscriber server, HSS. Other network components in the core network (also not shown for simplicity) include a policy charging and resource function, PCRF, and a packet data network gateway, PDN-GW, which provides a connection from the core network part 502 to an external packet data network, for example the Internet. As noted above, the operation of the various elements of the communications system 500 shown in FIG. 7 may be broadly conventional apart from where modified to provide functionality in accordance with embodiments of the present disclosure as discussed herein.

In this example, it is assumed the first terminal device 506 is a conventional smartphone type terminal device communicating with the base station 504 in a conventional manner. This conventional terminal device 506 comprises a transceiver unit 506a for transmission and reception of wireless signals and a processor unit 506b configured to control the device 506. The processor unit 506b may comprise a processor unit which is suitably configured/programmed to provide the desired functionality using conventional programming/configuration techniques for equipment in wireless telecommunications systems. The transceiver unit 506a and the processor unit 506b are schematically shown in FIG. 7 as separate elements. However, it will be appreciated that the functionality of these units can be provided in various different ways, for example using a single suitably programmed general purpose computer, or suitably configured application-specific integrated circuit(s)/circuitry. As will be appreciated the conventional terminal device 506 will in general comprise various other elements associated with its operating functionality.

In this example, it is assumed the second terminal device 508 is a machine-type communication (MTC) terminal device 504 adapted to support operation in accordance with embodiments of the present disclosure when communicating with the base station 504. As discussed above, machine-type communication terminal devices can in some cases be typically characterised as semi-autonomous or autonomous wireless communication devices communicating small amounts of data. Examples include so-called smart meters which, for example, may be located in a customer's house and periodically transmit information back to a central MTC server data relating to the customer's consumption of a utility such as gas, water, electricity and so on. MTC devices may in some respects be seen as devices which can be supported by relatively low bandwidth communication channels having relatively low quality of service (QoS), for example in terms of latency. It is assumed here the MTC terminal device 508 in FIG. 7 is such a device.

The MTC device 508 comprises a transceiver unit 508a for transmission and reception of wireless signals and a processor unit 508b configured to control the MTC device 508. The processor unit 508b may comprise various sub-units, for example a DRX control unit, for providing functionality in accordance with embodiments of the present disclosure as explained further herein. These sub-units may be implemented as discrete hardware elements or as appropriately configured functions of the processor unit. Thus the processor unit 508b may comprise a processor unit which is suitably configured/programmed to provide the desired functionality described herein using conventional programming/configuration techniques for equipment in wireless telecommunications systems. The transceiver unit 508a and the processor unit 508b are schematically shown in FIG. 7 as separate elements for ease of representation. However, it will be appreciated that the functionality of these units can be provided in various different ways, for example using a single suitably programmed general purpose computer, or suitably configured application-specific integrated circuit(s)/circuitry. It will be appreciated the MTC device 508 will in general comprise various other elements associated with its operating functionality.

The base station 504 comprises a transceiver unit 504a for transmission and reception of wireless signals and a processor unit 504b configured to control the base station 504 to operate in accordance with embodiments of the present disclosure as described herein. The processor unit 506b may again comprise various sub-units, such as a scheduling unit, for providing functionality in accordance with embodiments of the present disclosure as explained further below. These sub-units may be implemented as discrete hardware elements or as appropriately configured functions of the processor unit. Thus, the processor unit 504b may comprise a processor unit which is suitably configured/programmed to provide the desired functionality described herein using conventional programming/configuration techniques for equipment in wireless telecommunications systems. The transceiver unit 504a and the processor unit 504b are schematically shown in FIG. 7 as separate elements for ease of representation. However, it will be appreciated that the functionality of these units can be provided in various different ways, for example using a single suitably programmed general purpose computer, or suitably configured application-specific integrated circuit(s)/circuitry. It will be appreciated the base station 504 will in general comprise various other elements associated with its operating functionality.

Thus, the base station 504 is configured to communicate data with both the conventional terminal device 506 and the terminal device 508 according to an embodiment of the disclosure over respective communication links 510, 512. The base station 504 is configured to communicate with the conventional terminal device 506 over the associated radio communication link 510 following the established principles of LTE-based communications, and in particular using conventional DRX procedures. However, communications between the base station 504 and the MTC terminal device 508 operate using modified DRX procedures in accordance with certain embodiments of the present disclosure as described herein. Thus, one aspect of certain embodiments of the disclosure is that the base station is configured to operate by communicating with different classes of terminal device (e.g. a first class of terminal device, for example comprising conventional LTE terminal devices, such as smartphones, and a second class of terminal device, for example comprising MTC-type terminal devices) using different discontinuous reception procedures/modes. That is to say, a base station may operate to communicate with a first class (group/type) of terminal device in accordance with a first DRX mode (e.g. in accordance with conventional DRX procedures) and to communicate with a second class (group/type) of terminal device in accordance with a second DRX mode (e.g. in accordance with modified procedures such as described herein). Whether or not a particular terminal device or base station supports modified DRX procedures in accordance with embodiments of the present disclosure may be established in accordance with conventional techniques for sharing terminal device and base station capability information in wireless telecommunications networks, for example based on signalling exchange during a RRC connection establishment procedure.

In this example it is assumed the base station communicates with the first class of terminal device, e.g. the terminal device 506, using conventional DRX procedures, for example, following the principles schematically represented in FIGS. 4 to 7. However, the base station communicates with the second class of terminal device, e.g. the MTC terminal device 508, using modified procedures as described herein to help increase the amount of time the MTC terminal device can operate in the DRX active/reduced power mode.

In broad summary, in accordance with certain embodiments of the disclosure, a first and a second entity, for example a terminal device and a base station, may operate in a wireless telecommunications network to exchange a block of data. The first entity is operable to switch between a first operating mode (e.g. an awake mode/a DRX inactive mode/a connected mode) and a second operating mode (e.g. a sleep mode/a DRX active mode/an idle mode), wherein the second operating mode is a reduced-power mode as compared to the first operating mode. The first entity is operable to exchange the block of data with the second entity (e.g. to transmit the block of data to the second entity or receive the block of data from the second entity) while in the first operating mode, and to switch from the first operating mode to the reduced-power second operating mode in response to determining communications associated with the exchange of the block of data are complete. The second entity is configured to assume the first entity has switched to the second operating mode in response to determining communications associated with the exchange of the block of data are complete, and to take account of this for any further communications (for example by taking account of when the first terminal device will next exit the second operating mode, for example according to a predefined timing schedule, before attempting to contact the first entity for further communications.

Figure 8:
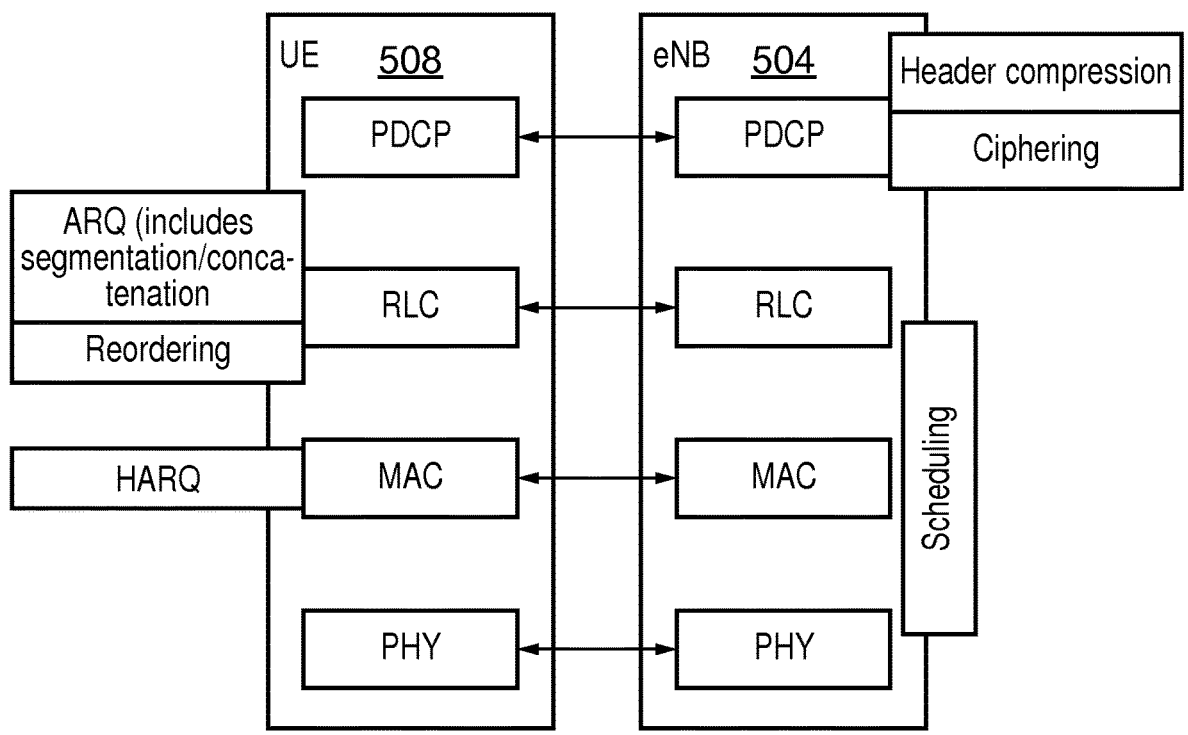
FIG. 8 schematically represents some aspects of a protocol stack in a wireless telecommunications network configured to operate in accordance with certain embodiments of the present disclosure.

FIG. 8 schematically shows some aspects of a user-plane protocol stack for the terminal device 508 and base station 504 for the LTE-based wireless telecommunications network 500 represented in FIG. 7. As is generally conventional, the protocol stack in this implementation comprises a physical layer, PHY, a medium access control layer, MAC, a radio link control layer, RLC, and a Packet Data Convergence Protocol layer, PDCP.

The PDCP layer supports efficient transport of IP packets over the radio link. It performs header compression, Access Stratum (AS) security (ciphering and integrity protection) and packet re-ordering/retransmission during handover.

The RLC layer on the transmitting side constructs RLC PDUs (protocol data units) and provides the RLC PDUs to the MAC layer. The RLC layer also performs packet re-ordering. The RLC protocol also performs segmentation/concatenation of PDCP PDUs where appropriate. On the receiving side, the RLC protocol performs reassembly of the RLC PDUs. The RLC protocol has three operational modes, namely transparent mode (TM), acknowledged mode (AM) and unacknowledged mode (UM).

In the RLC transparent mode (TM) PDUs pass the RLC layer without any modification and there is no RLC layer acknowledgement procedure. In the RLC unacknowledged mode (UM), service data units (SDUs) associated with higher layers are segmented into/reassembled from PDUs and RLC headers are used, but there is again no RLC layer acknowledgement procedure. The RLC acknowledged mode (AM) is similar to the unacknowledged mode, but also supports RLC layer implemented automatic repeat request (ARQ) acknowledgement procedures.

RLC AM is a selective-repeat ARQ procedure, which means that only PDUs which are missing (NACKd) are retransmitted, and unlike a stop-and-wait (SAW) procedure, the ARQ procedure allows for further transmissions without waiting for ACK/NACK. Further details of LTE-based RLC-implemented acknowledgement procedures can be found, for example, in ETSI TS 136 322 V12.2.0 (2015-04)/3GPP TS 36.322 version 12.2.0 Release 12 [7]. One aspect of such procedures is that a poll bit is set in the header of an RLC data PDU when there is no more data for transmission, e.g. because the transmission and retransmission buffers are empty (except for any data units currently waiting for acknowledgements) or because no further RLC data can be transmitted at the present time, for example due to window stalling. In effect, the poll bit in the header of an RLC data unit (PDU) indicates the data unit is the last data unit in a current group of data units comprising a block of data being transmitted. For applications associated with the transmission of relatively small amounts of data, the setting of a poll bit in the header of a PDU will typically indicate the associated PDU is the final PDU of a single SDU. Thus, for each SDU (i.e. higher layer message) a poll bit would typically be set on the final PDU, and a single acknowledgement would be received indicating whether or not the transmission was successful. If any PDU comprising the SDU is NACKed, then that (those) PDU (PDUs) would be retransmitted.

RLC headers for a PDU comprise a framing information field which indicates whether or not the PDU contains the first and/or last byte of data from an SDU. Thus, the framing information in effect also provide an indication of whether a PDU is the last PDU for a block of data.

The MAC layer lies between the RLC layer and PHY layer. It is connected to the RLC layer through logical channels, and to the PHY layer through transport channels, thus the MAC protocol supports multiplexing and de-multiplexing between logical channels and transport channels. Higher layers use different logical channels for different QoS (quality of service) metrics. The MAC protocol supports QoS by scheduling and prioritizing data from logical channels. The base station operates to ensure radio resources are dynamically allocated to terminal devices and performs QoS control to ensure each bearer is allocated the negotiated QoS. The MAC layer also supports hybrid automatic repeat request (HARQ) operations.

The PHY layer provides the radio interface between communicating entities.

Although the current example is described in the context of a generally conventional LTE-based protocol stack, it may be expected other implementations may adopt modified protocol stacks. For example, whereas it might be expected that enhanced DRX (eDRX) procedures will implement a protocol stack corresponding to that which is conventionally used in LTE, in other implementations there may be, for example, fewer MAC HARQ processes provided and existing functionality not considered necessary for certain implementations may be removed (for example BTYE count based poll trigger procedures in the RLC layer my not be considered necessary for some applications).

Furthermore, other implementations in accordance with embodiments of the disclosure may be based on other wireless telecommunications systems variants, for example a narrowband Internet of Things "NB-IoT" implementation may be adopted in some embodiments. It may be expected that a NB-IoT wireless telecommunications systems may share some similarities with an LTE-based Telecom application systems, but may include a new physical channel which might not be FDMA on uplink or which might, for example, use FDMA with GMSK (Gaussian minimum shift keying) modulation. Nonetheless, the principles described herein in respect of the higher layers, for example RLC and MAC layers of an LTE-based implementation, may be applied in the same manner.

Figure 9:
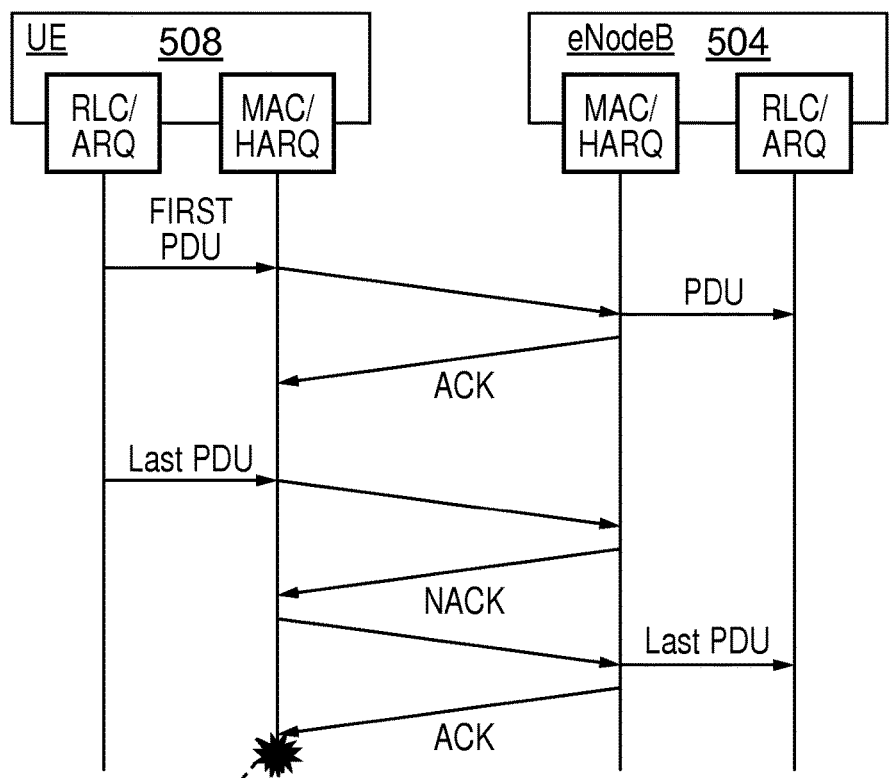
FIGS. 9 to 12 are ladder diagrams schematically representing some operating aspects of a terminal device and a base station in accordance with certain embodiments of the present disclosure.

FIG. 9 is ladder diagram indicating signalling between the terminal device 508 and the base station 504 represented in FIG. 7 in accordance with an embodiment of the disclosure. This particular implementation assumes an RLC unacknowledged mode of operation is being used to transmit data from the terminal device to the base station while the terminal device is in a DRX inactive mode (awake) in accordance with conventional techniques. It is further assumed the terminal device 508 has a block of data (e.g. an SDU) which is segmented into a plurality of PDUs. The example of FIG. 9 assumes the SDU (i.e. the block of data to be transmitted) comprises two PDUs, namely a first PDU and a last PDU. However, it will be appreciated in other cases the block of data may comprise only one data unit or more than two data units. In the case of only one data unit, that data unit may be considered the last data unit (last PDU). In the case of more than two data units, all the data units apart from the last data unit may in effect be handled in the same way as the first PDU.

The RLC layer and MAC layer for each of the terminal device 508 and the base station 504 are schematically represented in FIG. 9. The other layers are not shown for simplicity.

Moving from the top of the ladder diagram downwards, in a first step the UE RLC layer forwards a PDU to the UE MAC layer for transmission to the base station. The UE MAC layer transmits this data unit to the base station MAC layer via the physical layer (not shown in FIG. 9 for simplicity). In this example the base station MAC layer successfully receives the PDU and forwards it onto the base station RLC layer and sends positive MAC layer acknowledgement signalling (ACK) back to the UE MAC layer. In the next step of the ladder diagram represented in FIG. 9, the UE RLC layer forwards the next (which in this case is the last) PDU to the UE MAC layer for transmission is to the base station. In this example the base station MAC layer is assumed to fail to successfully receive the final PDU and sends negative MAC layer HARQ acknowledgement signalling (NACK) back to the UE MAC layer. The UE MAC layer responds by retransmitting the last PDU to the base station. In this example the base station MAC layer successfully receives the retransmitted last PDU and forwards it onto the base station RLC layer and sends positive MAC layer acknowledgement signalling (ACK) back to the UE MAC layer. This concludes the exchange of the block of data made up of the first PDU and the last PDU from the terminal device to the base station. This process of exchanging the data may be performed in accordance with conventional techniques.

However, as indicated at the bottom of the ladder diagram represented in FIG. 9, in accordance with certain embodiments of the disclosure, the terminal device 508 is configured to recognise when communications associated with the exchange of the block of data are complete (e.g. when it has received positive MAC layer acknowledgement signalling in respect of the last PDU), and to switch to a reduced-power mode of operation (e.g. a DRX active mode) in response to this. There are several ways in which the terminal device can determine which is the last PDU to be transmitted for a given block of data. For example, this may be based on the terminal device determining that its transmission buffers are empty or based on framing information in an RLC header for a PDU indicating the PDU contains the last byte of an SDU. Typically this will be determined at the RLC layer and the RLC layer can thus indicate to the MAC layer, e.g. using the RLC header or separate signalling, which is the last PDU, so the MAC layer knows to trigger the transition to the reduced-power mode when the MAC layer HARQ procedure indicates positive acknowledgement signalling in respect of this PDU. In other implementations, the MAC layer itself may be configured to inspect the headers of the PDUs to identify when the last PDU is transmitted. However, this may in some implementations be considered undesirable because it does not fully align with the usual practices associated with inter-layer operations.

In the case of switching to a DRX active mode, this procedure is driven by the MAC layer. However, other transitions which may occur in accordance with the other implementations, for example from a connected mode to an idle mode, may be controlled by other layers, for example the RRC layer. In this case the completion of signalling associated with the transfer of the block of data may be reported to the relevant layer to initiate the transition.

Figure 10:
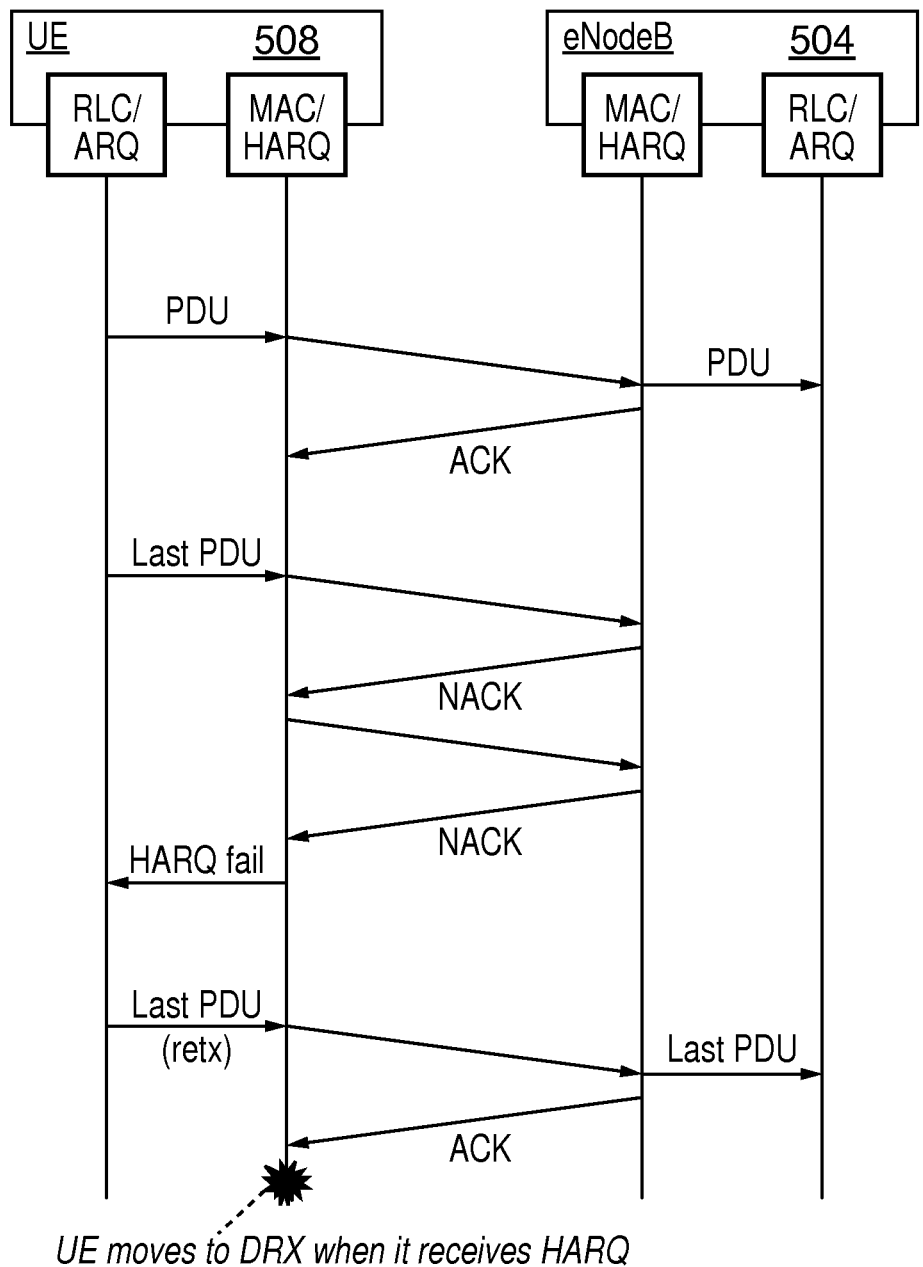

FIG. 10 is similar to, and will be answered from, FIG. 9, but shows a corresponding scenario in which the MAC layer HARQ procedure in respect of the last PDU fails, for example because successful acknowledgement signalling is not received after a threshold number of HARQ retransmissions. In this case the UE MAC layer reports the MAC layer HARQ fail up to the UE RLC layer. The UE RLC layer may then initiate a retransmission (retx) of the last PDU. Thus, it is when the last PDU (re)transmission is successfully acknowledged by the MAC layer HARQ procedure that the terminal device is configured to switch to the reduced-power operating mode (i.e. DRX active in this example implementation), as schematically indicated at the bottom of FIG. 10.

At the base station side, the base station knows when the base station MAC layer transmits positive HARQ acknowledgement signalling in respect of the last PDU received from the terminal device, and so can assume the terminal device has transitioned to the reduced-power mode, and tailor its subsequent operations accordingly. For example, in the case the reduced-power mode is a DRX active mode, the base station may be configured to wait until the terminal device will next transition to the DRX inactive mode (i.e. wake-up) before seeking to establish contact with the terminal device, for example to undertake further communications. In this regard, once the terminal device has transitioned to the reduced-power mode of operation in accordance with an embodiment of the disclosure, a subsequent cycle of wake and sleep periods may be established in accordance with conventional techniques (e.g. based on conventional DRX timers as discussed above).

Although the approach represented in FIGS. 9 and 10 focuses on an RLC unacknowledged mode of operation, broadly the same principles can be applied for an RLC transparent mode of operation. In this case the RLC layer may be configured to indicate the end of the transmission of the block of data to the MAC layer by using of a dedicated indicator for this purpose.

Figure 11:
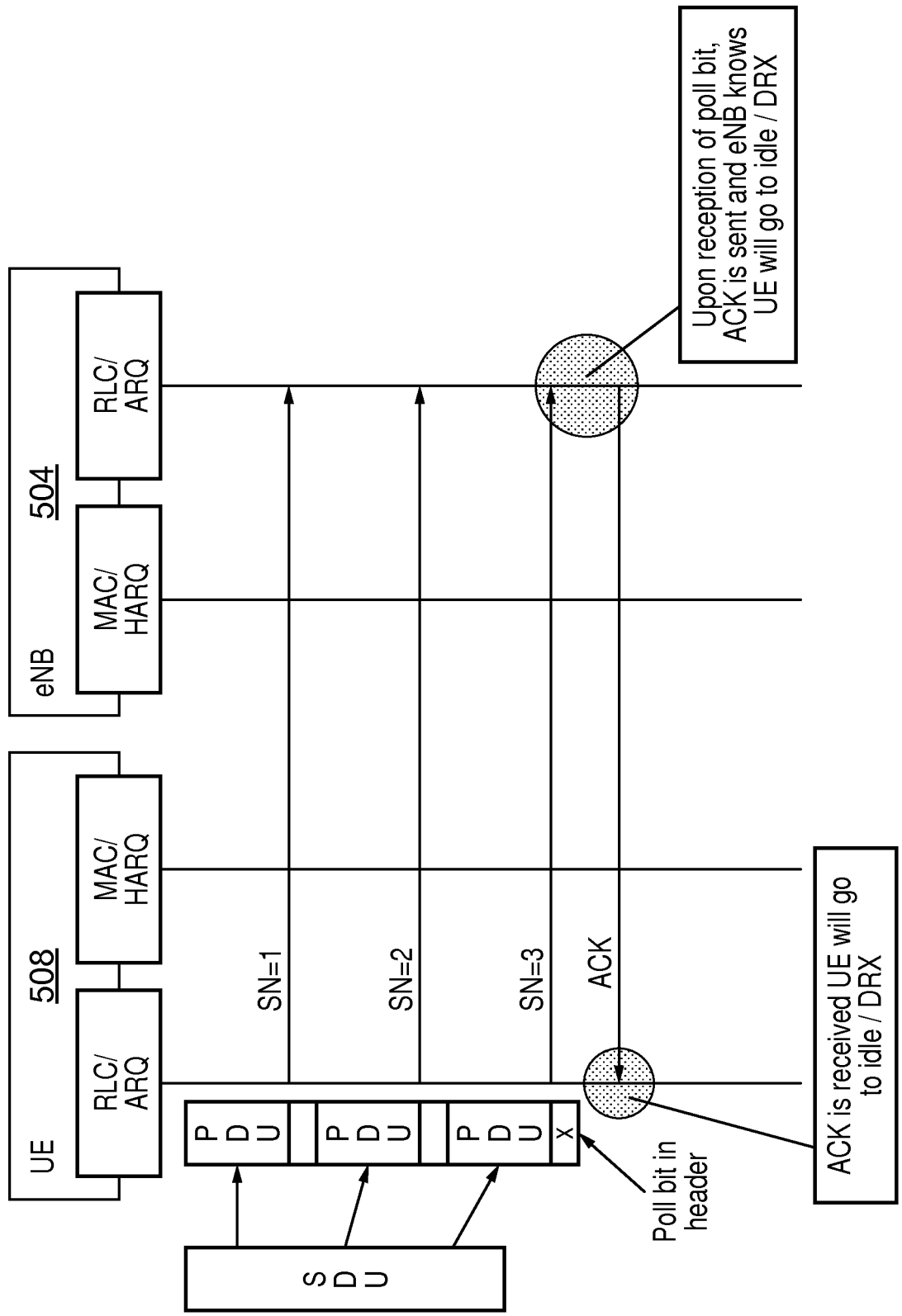

FIG. 11 is similar to, and will be understood from, FIGS. 9 and 10. However, whereas FIGS. 9 and 10 show examples for an RLC unacknowledged mode of operation, FIG. 11 shows an example implementation in accordance with an embodiment of disclosure using an RLC acknowledged mode (AM) of operation.

As indicated in the figure, in this example it is assumed an SDU comprising a block of data to be exchanged between the terminal device 508 and the base station 504 (which in this case is uplink data transmitted from the terminal device to the base station) is segmented into three PDUs at the UE RLC layer. The polling bit in the header of the last PDU is set to indicate it is the last PDU in accordance with conventional techniques (schematically shown as an "X" in the figure). The respective PDUs are passed from the UE RLC to the UE MAC and transmitted via the physical layer to the base station MAC layer and passed up to the base station RLC layer in accordance with conventional techniques, and schematically represented in the figure by the signalling indicated by the labels "SN=1" for the first PDU, "SN=2" for the second PDU and "SN=3" for the third, and last, PDU. Although not shown in FIG. 11 for simplicity, it will be appreciated the transmissions of the respective PDUs between the respective MAC layers will be associated with MAC HARQ signalling of the kind represented in FIGS. 9 and 10 in the usual way.

On receiving the last PDU (i.e. the PDU with the poll bit set in its header), the base station RLC layer responds to detecting the poll bit by sending RLC layer acknowledgement signalling back to the UE RLC layer (via the other layers in the usual way). This is schematically represented in the figure by the signalling indicated by the label "ACK".

On receiving the positive acknowledgement signalling from the base station, the terminal device recognises that communications associated with the transfer of the block of data (i.e. the SDU) are complete, and the terminal device may transition to the reduced-power mode (e.g. a DRX active mode or an RRC idle mode depending on the specific reduced-power operating mode in respect of which the method is implemented).

Similarly, on transmitting the positive acknowledgement signalling from the base station, the base station recognises it will cause the terminal device to automatically switch to the reduced-power mode, and the base station can act accordingly (i.e. treat the terminal device as having transitioned to the reduced power mode when determining how to undertake further communications with the terminal device, for example in terms of establishing timings for when the terminal device will be next awake and able to receive signalling). In practice, it may be appropriate for the base station to wait for MAC layer HARQ positive acknowledgement signalling in respect of the ACK signalling send in response to detection of the poll bit before assuming the terminal device has transitioned to the reduced-power state.

Although the example of FIG. 11 is shown in respect of uplink signalling, i.e. data transmission from the terminal device to the base station, it will be appreciated the same principles apply in respect of downlink signalling. Here the SDU will be segmented at the base station RLC layer and received at the terminal device RLC layer. When the terminal device receives the last PDU (i.e. a PDU containing the poll bit set in the header), the terminal device may send acknowledgement signalling back to the base station and then transition to the reduced-power mode. The base station, on receiving the acknowledgement signalling, may then assume the terminal device has made the transition, and again act accordingly in respect of future operations vis-à-vis the terminal device. That is to say, the terminal device may be configured to determine when communications associated with downlink data (i.e. data transmitted from the base station to the terminal device) are complete, and transition to the low power mode in response to this. The timing of the transition to the low-power mode may be based on when the terminal device has received MAC layer HARQ positive acknowledgement signalling in respect of an uplink status reports sent in response to the detection of a poll bit.

Note that there is an alternative approach to that shown in FIG. 6. In the alternative approach, the eNB implementation is designed to explicitly insert a MAC control element that instructs the UE to go into DRX state. From a UE perspective, this approach is less desirable since the UE cannot rely on the eNB implementing this functionality. Hence the UE needs to be designed to handle the case where the eNB does not implement this functionality (e.g. the UE battery needs to be dimensioned assuming the UE needs to apply DRX timers).

In case the base station is performing the transmission, the poll bit is set by the base station and the successful STATUS report (RLC layer acknowledgement signalling) is generated by the terminal device. The sending of the STATUS report may, for example, be considered complete once the MAC/L1 procedure has completed (i.e. HARQ ACK is received).

Figure 12:
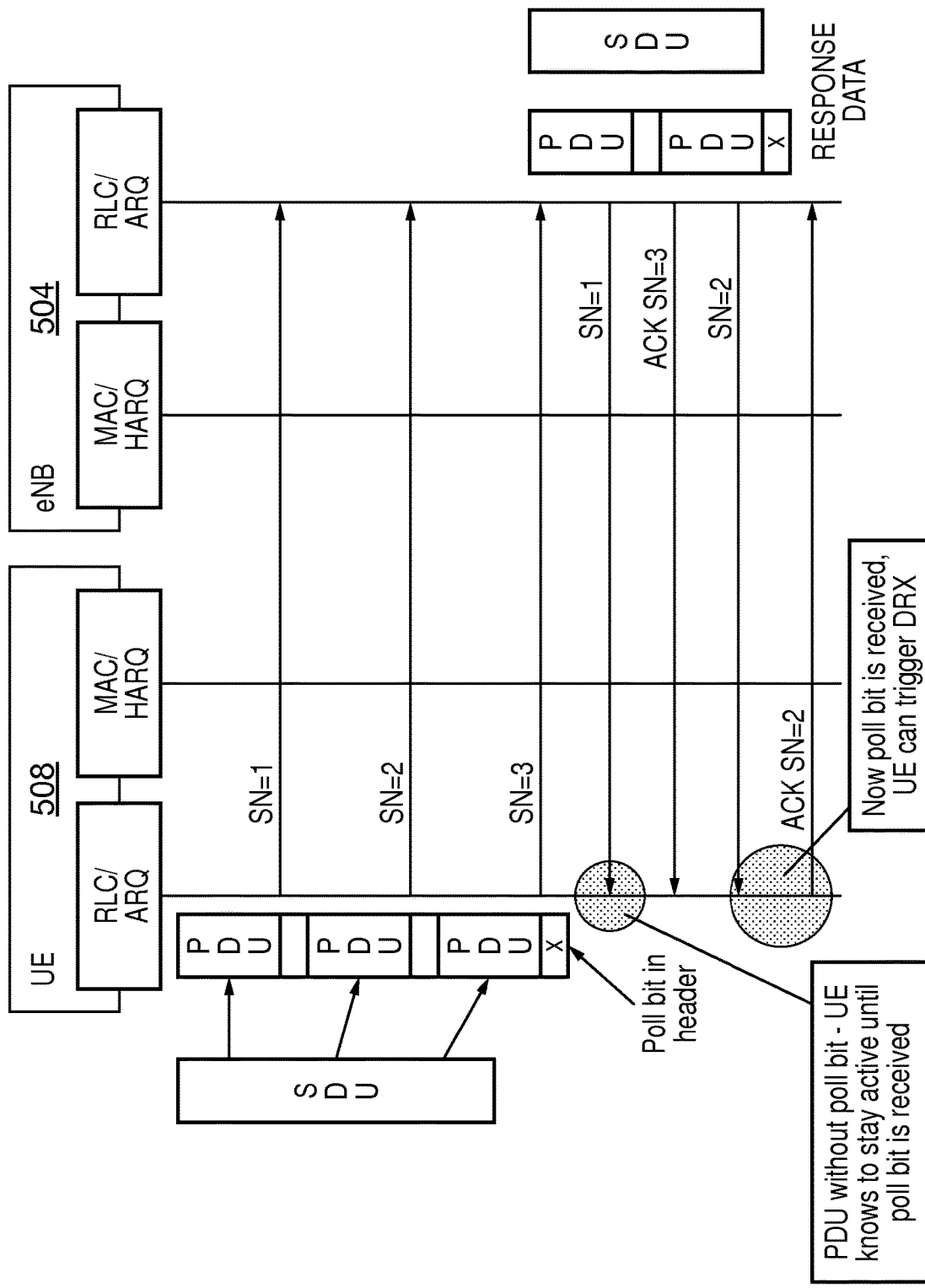

FIG. 12 is similar to, and will be generally understood from, FIG. 11, but shows a variation on that approach whereby the entity receiving the block of data being exchanged (i.e. the base station in the example of FIG. 12) has a mechanism for indicating to the transmitting entity (i.e. the terminal device in the example of FIG. 12) that it has its own data to transfer back to the other entity, and so the other entity should avoid entering the reduced power mode.

One approach by which the receiving entity can prevent the transmitting entity from entering the reduced power mode is to simply delay acknowledging the receipt of the data from the transmitting entity until it has initiated its own transmissions back to the transmitting entity.

Thus, the upper half of FIG. 12, i.e. down as far as the transmission of the third (last) PDU from the UE to the base station, is the same as for FIG. 11. However, on receiving the block of data from the terminal device, it is assumed the higher layers at the base station generate a response which is to be transmitted back to the terminal device. In this example it is assumed the response data comprises an SDU which is segmented at the base station into two PDUs, as schematically indicated in the figure.

Accordingly, the base station delays the sending of acknowledgement signalling in response to the uplink PDU containing the poll bit (this signalling is schematically indicated in FIG. 12 by the signalling labelled "ACK SN=3") until after it has sent the first of its two downlink PDUs to the terminal device (represented in FIG. 12 by the arrow from the base station RLC layer to the UE RLC layer labelled "SN=1").

On receiving the first downlink PDU from the base station, the terminal device recognises this PDU is received without a poll bit being set, which indicates the base station has at least one more PDU to send, and so the UE remains in the active mode, even on subsequently receiving the acknowledgement signalling ("Ack SN=3") in response to its own previous transmissions. When the terminal device receives the downlink PDU containing the polling bit (represented in FIG. 12 by the arrow from the base station RLC layer to the UE RLC layer labelled "SN=2"), the terminal device recognises this is the last PDU of the block of downlink data (SDU) being transmitted by the base station, and responds with acknowledgement signalling in the usual way (this signalling is schematically indicated in FIG. 12 by the signalling labelled "ACK SN=2").

On subsequently receiving positive MAC layer HARQ acknowledgement signalling in respect of the report "SN=2" (not shown in FIG. 12 for simplicity), the terminal device may transition to the reduced power mode. Similarly, on receiving the successfully report "SN=2" from the terminal device, the base station may assume the terminal device will transition to the reduced-power mode, and configure its subsequent communications with the terminal device accordingly (i.e. taking account of when the terminal device will next be awake).

As an alternative to delaying the acknowledgement signalling in respect of the initial uplink transmissions, the base station may be configured to provide an explicit indication, for example through bespoke signalling, to indicate the terminal device should not transition to the reduced power mode.

Thus, in accordance with the principles described herein, a terminal device may transition to a reduced power mode more quickly than with conventional techniques, and in particular it may do this without having to wait for any timer to expire, or having to wait for explicit signalling from the base station to indicate it should transition to the reduced power state. The same principles can be applied regardless of whether the terminal device is transmitting data to the base station, or whether the base station is transmitting data to the terminal device.

In broad summary, the terminal device is configured to determine when communications associated with the exchange of a block of data with the base station are complete, and to transition into the low-power mode in response to this. Similarly, the base station is also configured to determine when communications associated with the exchange of a block of data with the terminal device are complete, and to assume the terminal device will transition into the low-power mode in response to this. Thus, in accordance with some embodiments, a UE enters DRX upon completion of data transmission or reception without using inactivity timer or explicit DRX command in MAC. AM RLC poll bit is set upon transmission of the last PDU in the buffer—for small data applications this will often be the last PDU of a single RLC SDU. For downlink data reception, UE can enter DRX when the poll bit is received. For uplink data transmission, UE may be configured to enter DRX when the RLC ACK is received in response to setting poll bit in the last PDU transmitted in the uplink. For UM or TM RLC the UE may be configured to automatically enter DRX upon transmission of last PDU in buffer.

It will be appreciated there are various modifications to the principles described above that may be adopted in other implementations. For example, whereas in some examples conventional poll bits and/or framing information is used to provide an indication a data unit is the last of a block of data units to be exchanged for the purposes of determining when to transition to a reduced-power mode, in other implementations different indications may be used, for example a new field in the RLC header may be defined to carry an appropriate indication.

Furthermore, and as already mentioned, although the examples above have primarily focused on transition from a DRX inactive mode to a DRX active mode, the same principles can be adopted in respect of transitions between other pairs of modes where one mode is a reduced-power mode as compared to the other. For example, the same principles can be applied in respect of transitions from a radio resource connected, RRC, control mode to a radio resource control, RRC, idle mode and/or from a radio resource connected, RRC, control mode to a radio resource control, RRC, suspended mode.

In some respects, the non-reduced-power operating mode may be a mode in which the terminal device is configured to monitor a downlink control channel (e.g. PDCCH in LTE) for radio resource allocation signalling from the base station and the reduced-power operating mode may be a mode in which the terminal device is configured to not monitor the downlink control channel for the radio resource allocation signalling from the base station.

It will be appreciated that a base station executing methods in accordance with embodiments of the disclosure as described herein in respect of its communications with certain terminal devices may also be communicating with other terminal devices in the network in accordance with conventional techniques. For example, a base station may communicate with some terminal devices in accordance with embodiments of the disclosure described herein and other terminal devices that It will be appreciated that while some of the above-described embodiments have focused on examples in which a base station of the wireless telecommunications system is providing functionality in accordance with the principles described herein, in other implementations similar functionality may be provided by other components of the wireless telecommunications network infrastructure. For example, some, or all, of the processing described above in relation to the base station may be provided by a core network component of the wireless telecommunications system and/or similar functionality may be provided by other infrastructure elements, such as relay nodes and/or dedicated units for supporting an ITS scheme, for example roadside units (RSUs) deployed in association with a road network to facilitate vehicle-to-vehicle communications in accordance with previously proposed schemes. In this regard a base station may be considered as one example of network infrastructure equipment and maybe configured to provide functionality of the kind described herein.

Thus there has been described a method of operating a terminal device in a wireless telecommunications system, wherein the terminal device is configured to selectively switch between an active operating mode and a reduced-power operating mode, wherein the method comprises: communicating with a network entity to exchange a block of data between the terminal device and the network entity while the terminal device is in the active operating mode; determining when communications associated with the exchange of the block of data are complete; and in response to determining communications associated with the exchange of the block of data are complete, switching from the active operating mode to the reduced-power operating mode. The terminal device supports a protocol stack comprising a physical, PHY, layer, a medium access control, MAC, layer, and a radio link control, RLC, layer, and determining when communications associated with the exchange of the block of data are complete and the device should switch to the low-power mode is performed by the radio link control, RLC, layer.

Further particular and preferred aspects of the present invention are set out in the accompanying independent and dependent claims. It will be appreciated that features of the dependent claims may be combined with features of the independent claims in combinations other than those explicitly set out in the claims.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

Respective features of the present disclosure are defined by the following numbered paragraphs:

1. A method of operating a terminal device in a wireless telecommunications system, wherein the terminal device is configured to selectively switch between an active operating mode and a reduced-power operating mode, wherein the method comprises:
   communicating with a network entity to exchange a block of data between the terminal device and the network entity while the terminal device is in the active operating mode;
   determining when communications associated with the exchange of the block of data are complete; and
   in response to determining communications associated with the exchange of the block of data are complete, switching from the active operating mode to the reduced-power operating mode.

2. The method of paragraph 1, wherein the terminal device supports a protocol stack comprising a physical, PHY, layer, a medium access control, MAC, layer, and a radio link control, RLC, layer, and wherein determining when communications associated with the exchange of the block of data are complete is performed at the radio link control, RLC, layer.

3. The method of paragraph 1 or 2, wherein communicating with the network entity to exchange the block of data comprises transmitting the block of data from the terminal device to the network entity, wherein the block of data is framed or segmented into one or more uplink data units for transmission from the terminal device to the network entity.

4. The method of paragraph 3, wherein determining when communications associated with the exchange of the block of data are complete comprises determining when the last one of the uplink data units comprising the block of data has been transmitted to the network entity.

5. The method of paragraph 3 or 4, wherein determining when communications associated with the exchange of the block of data are complete comprises determining when acknowledgment signalling is received form the network entity which indicates the last one of the uplink data units comprising the block of data transmitted to the network entity has been successfully received by the network entity.

6. The method of any of paragraphs 3 to 6, further comprising the terminal device conveying to the network entity an indicator to indicate an uplink data unit comprising the block of data is the last of the uplink data units comprising the block of data to be transmitted.

7. The method of paragraph 6, wherein the respective uplink data units comprising the block of data are associated with a header for transmission, and wherein the header for the last of the uplink data units comprising the block of data to be transmitted comprises the indicator.

8. The method of paragraph 7, wherein the terminal device supports a protocol stack comprising a physical, PHY, layer, a medium access control, MAC, layer, and a radio link control, RLC, layer, and wherein the indicator is provided by the radio link control, RLC, layer setting a polling bit in the header for the last of the uplink data units comprising the block of data to be transmitted to a predefined value.

9. The method of paragraph 7 or 8, wherein the header for an uplink data unit comprises a framing information field for indicating whether or not the uplink data unit comprises the last byte of the block of data to be transmitted, and wherein the indicator is provided by the radio link control, RLC, layer setting a value for framing information field that indicates the associated uplink data unit comprises the last byte of the block of data to be transmitted.

10. The method of any of paragraphs 3 to 9, further comprising the terminal device receiving an indication from the network entity to indicate the terminal device should delay switching to the reduced-power operating mode after the communications associated with the exchange of the block of data are complete.

11. The method of any of paragraphs 1 to 10, wherein communicating with the network entity to exchange the block of data comprises the terminal device receiving the block of data from the network entity, wherein the block of data is segmented into one or more downlink data units for transmission from the network entity to the terminal device.

12. The method of paragraph 11, wherein determining when communications associated with the exchange of the block of data are complete comprises determining when the last one of the downlink data units comprising the block of data has been received from the network entity.

13. The method of paragraph 11 or 12, wherein determining when communications associated with the exchange of the block of data are complete comprises determining when acknowledgment signalling is transmitted by the terminal device to the network entity to indicate the last one of the downlink data units comprising the block of data transmitted by the network entity has been successfully received by the terminal device.

14. The method of any of paragraphs 11 to 13, further comprising the terminal device determining a downlink data unit is the last of the downlink data units comprising the block of data to be transmitted by the network entity by detecting an indicator transmitted by the network entity to indicate an associated downlink data unit is the last of the downlink data units comprising the block of data to be transmitted by the network entity.

15. The method of paragraph 14, wherein the downlink data units comprising the block of data are each associated with a header for transmission, and wherein the header for the last of the downlink data units comprising the block of data to be transmitted by the network entity comprises the indicator.

16. The method of paragraph 15, wherein the terminal device supports a protocol stack comprising a physical, PHY, layer, a medium access control, MAC, layer, and a radio link control, RLC, layer, and wherein determining a downlink data unit is the last of the downlink data units comprising the block of data to be transmitted by the network entity comprises the terminal device radio link control, RLC, layer identifying that a polling bit in the header for a downlink data unit is set to a predefined value.

17. The method of paragraph 15 or 16, wherein the header for a downlink data unit comprises a framing information field for indicating whether or not the downlink data unit comprises the last byte of the block of data to be transmitted, and wherein determining a downlink data unit is the last of the downlink data units comprising the block of data to be transmitted by the network entity comprises the terminal device radio link control, RLC, layer identifying that a value for the framing information field indicates the associated downlink data unit comprises the last byte of the block of data to be transmitted by the network entity.

18. The method of any of paragraphs 1 to 17, further comprising the terminal device determining it should delay switching to the reduced-power operating mode after the communications associated with the exchange of the block of data are complete because the terminal device has uplink data waiting to be transmitted to the network entity.

19. The method of any of paragraphs 1 to 18,
wherein the active operating mode corresponds with a discontinuous reception, DRX, inactive mode and the reduced-power operating mode corresponds with a discontinuous reception, DRX, active mode;
and/or;
wherein the active operating mode corresponds with a radio resource connected, RRC, control mode, and the reduced-power operating mode corresponds with a radio resource control, RRC, idle mode;
and/or;
wherein the active operating mode corresponds with a radio resource connected, RRC, control mode, and the reduced-power operating mode corresponds with a radio resource control, RRC, suspended mode.

20. The method of any of paragraphs 1 to 19, wherein the active operating mode is a mode in which the terminal device is configured to monitor a downlink control channel for radio resource allocation signalling from the network entity and the reduced-power operating mode is a mode in which the terminal device is configured to not monitor the downlink control channel for the radio resource allocation signalling from the network entity.

21. The method of any of paragraphs 1 to 20, wherein the network entity comprises a base station, a relay node, or another terminal device operating in the wireless communications system.

22. A terminal device for use in a wireless telecommunications system, wherein the terminal device is configured to selectively switch between an active operating mode and a reduced-power operating mode, and wherein the terminal device comprises a controller unit and a transceiver unit configured to operate together to:
  communicate with a network entity to exchange a block of data between the terminal device and the network entity while the terminal device is in the active operating mode;
  determine when communications associated with the exchange of the block of data are complete; and
  in response to determining communications associated with the exchange of the block of data are complete, to switch from the active operating mode to the reduced-power operating mode.

23. Circuitry for a terminal device for use in a wireless telecommunications system, wherein the terminal device is configured to selectively switch between an active operating mode and a reduced-power operating mode, wherein the circuitry comprises a controller element and a transceiver element configured to operate together to:
  communicate with a network entity to exchange a block of data between the terminal device and the network entity while the terminal device is in the active operating mode;
  determine when communications associated with the exchange of the block of data are complete; and
  in response to determining communications associated with the exchange of the block of data are complete, to switch from the active operating mode to the reduced-power operating mode.

24. A method of operating network infrastructure equipment in a wireless telecommunications system supporting communication between the network infrastructure equipment and a terminal device, wherein the terminal device is configured to selectively switch between an active operating mode and a reduced-power operating mode, wherein the method comprises:
  communicating with the terminal device to exchange a block of data between the network infrastructure equipment and the terminal device while the terminal device is in the active operating mode;
  determining when communications associated with the exchange of the block of data are complete; and
  in response to determining communications associated with the exchange of the block of data are complete, determining that the terminal device has switched from the active operating mode to the reduced-power operating mode.

25. The method of paragraph 24, wherein the network infrastructure equipment supports a protocol stack comprising a physical, PHY, layer, a medium access control, MAC, layer, and a radio link control, RLC, layer, and wherein determining when communications associated with the exchange of the block of data are complete is performed at the radio link control, RLC, layer.

26. The method of paragraph 24 or 25, wherein communicating with the terminal device to exchange the block of data comprises transmitting the block of data from the network infrastructure equipment to the terminal device, wherein the block of data is framed or segmented into one or more downlink data units for transmission from the network infrastructure equipment to the terminal device.

27. The method of paragraph 26, wherein determining when communications associated with the exchange of the block of data are complete comprises determining when the last one of the downlink data units comprising the block of data has been transmitted to the terminal device.

28. The method of paragraph 26 or 27, wherein determining when communications associated with the exchange of the block of data are complete comprises determining when acknowledgment signalling is received form the terminal device which indicates the last one of the downlink data units comprising the block of data transmitted to the terminal device has been successfully received by the terminal device.

29. The method of any of paragraphs 26 to 28, further comprising the network infrastructure equipment conveying to the terminal device an indicator to indicate a downlink data unit comprising the block of data is the last of the downlink data units comprising the block of data to be transmitted.

30. The method of paragraph 29, wherein the respective downlink data units comprising the block of data are associated with a header for transmission, and wherein the header for the last of the downlink data units comprising the block of data to be transmitted comprises the indicator.

31. The method of paragraph 30, wherein the network infrastructure equipment supports a protocol stack comprising a physical, PHY, layer, a medium access control, MAC, layer, and a radio link control, RLC, layer, and wherein the indicator is provided by the radio link control, RLC, layer setting a polling bit in the header for the last of the downlink data units comprising the block of data to be transmitted to a predefined value.

32. The method of paragraph 30 or 31, wherein the header for a downlink data unit comprises a framing information field for indicating whether or not the downlink data unit comprises the last byte of the block of data to be transmitted, and wherein the indicator is provided by the radio link control, RLC, layer setting a value for framing information field that indicates the associated downlink data unit comprises the last byte of the block of data to be transmitted.

33. The method of any one of paragraphs 26 to 32, further comprising the network infrastructure equipment receiving an indication from the terminal device to indicate the network infrastructure equipment should delay switching to the reduced-power operating mode after the communications associated with the exchange of the block of data are complete.

34. The method of any of paragraphs 24 to 33, wherein communicating with the terminal device to exchange the block of data comprises the network infrastructure equipment receiving the block of data from the terminal device, wherein the block of data is segmented into one or more downlink data units for transmission from the terminal device to the network infrastructure equipment.

35. The method of paragraph 34, wherein determining when communications associated with the exchange of the block of data are complete comprises determining when the last one of the downlink data units comprising the block of data has been received from the terminal device.

36. The method of paragraph 34 or 35, wherein determining when communications associated with the exchange of the block of data are complete comprises determining when acknowledgment signalling is transmitted by the network infrastructure equipment to the terminal device to indicate the last one of the downlink data units comprising the block of data transmitted by the terminal device has been successfully received by the network infrastructure equipment.

37. The method of any one of paragraphs 34 to 36, further comprising the network infrastructure equipment determining a downlink data unit is the last of the downlink data units comprising the block of data to be transmitted by the terminal device by detecting an indicator transmitted by the terminal device to indicate an associated downlink data unit is the last of the downlink data units comprising the block of data to be transmitted by the terminal device.

38. The method of paragraph 37, wherein the downlink data units comprising the block of data are each associated with a header for transmission, and wherein the header for the last of the downlink data units comprising the block of data to be transmitted by the terminal device comprises the indicator.

39. The method of paragraph 38, wherein the network infrastructure equipment supports a protocol stack comprising a physical, PHY, layer, a medium access control, MAC, layer, and a radio link control, RLC, layer, and wherein determining a downlink data unit is the last of the downlink data units comprising the block of data to be transmitted by the terminal device comprises the network infrastructure equipment radio link control, RLC, layer identifying that a polling bit in the header for a downlink data unit is set to a predefined value.

40. The method of paragraph 38 or 39, wherein the header for a downlink data unit comprises a framing information field for indicating whether or not the downlink data unit comprises the last byte of the block of data to be transmitted, and wherein determining a downlink data unit is the last of the downlink data units comprising the block of data to be transmitted by the terminal device comprises the network infrastructure equipment radio link control, RLC, layer identifying that a value for the framing information field indicates the associated downlink data unit comprises the last byte of the block of data to be transmitted by the terminal device.

41. The method of any of paragraphs 24 to 40, further comprising the network infrastructure equipment determining it should delay determining that the terminal device has switched from the active operating mode to the reduced-power operating mode because the network infrastructure equipment has uplink data waiting to be transmitted to the terminal device.

42. The method of any of paragraphs 24 to 41,
wherein the active operating mode corresponds with a discontinuous reception, DRX, inactive mode and the reduced-power operating mode corresponds with a discontinuous reception, DRX, active mode;
and/or;
wherein the active operating mode corresponds with a radio resource connected, RRC, control mode, and the reduced-power operating mode corresponds with a radio resource control, RRC, idle mode;
and/or;
wherein the active operating mode corresponds with a radio resource connected, RRC, control mode, and the reduced-power operating mode corresponds with a radio resource control, RRC, suspended mode.

43. The method of any of paragraphs 24 to 42, wherein the active operating mode is a mode in which the network infrastructure equipment is configured to transmit radio resource allocation signalling to the terminal device on a downlink control channel and the reduced-power operating mode is a mode in which the network infrastructure equipment is configured to not transmit radio resource allocation signalling to the terminal device on the downlink control channel.

44. The method of paragraph 24 wherein the terminal device comprises a base station, a relay node, or another network infrastructure equipment operating in the wireless communications system.

45. Network infrastructure equipment for use in a wireless telecommunications system supporting communication between the network infrastructure equipment and a terminal device, wherein the terminal device is configured to selectively switch between an active operating mode and a reduced-power operating mode, and wherein the network infrastructure equipment comprises a controller unit and a transceiver unit configured to operate together to:
communicate with the terminal device to exchange a block of data between the network infrastructure equipment and the terminal device while the terminal device is in the active operating mode;
determine when communications associated with the exchange of the block of data are complete; and
in response to determining communications associated with the exchange of the block of data are complete, to determine that the terminal device has switched from the active operating mode to the reduced-power operating mode.

46. Circuitry for network infrastructure equipment for use in a wireless telecommunications system supporting communication between the network infrastructure equipment and a terminal device, wherein the terminal device is configured to selectively switch between an active operating mode and a reduced-power operating mode, wherein the circuitry comprises a controller element and a transceiver element configured to operate together to:
communicate with the terminal device to exchange a block of data between the network infrastructure equipment and the terminal device while the terminal device is in the active operating mode;
determine when communications associated with the exchange of the block of data are complete; and
in response to determining communications associated with the exchange of the block of data are complete, to determine that the terminal device has switched from the active operating mode to the reduced-power operating mode.

REFERENCES

[1] ETSI TS 122 368 V12.4.0 (2014-10)/3GPP TS 22.368 version 12.4.0 Release 12
[2] Holma H. and Toskala A, "LTE for UMTS OFDMA and SC-FDMA based radio access", John Wiley and Sons, 2009
[3] ETSI TS 136 331 V12.7.0 (2015-10)/3GPP TS 36.331 version 12.7.0 Release 12
[4] ETSI TS 136 321 V12.7.0 (2015-10)/3GPP TS 36.321 version 12.7.0 Release 12
[5] R-152342, 3GPP TSG-RAN WG2 Meeting #90bis, Fukuoka, Japan, May 25-29, 2015
[6] WO 2014/024175

[7] ETSI TS 136 322 V12.2.0 (2015-04)/3GPP TS 36.322 version 12.2.0 Release 12

What is claimed is:

1. A method of operating a terminal device in a wireless telecommunications system, wherein the terminal device is configured to selectively switch between an active operating mode and one of a first reduced-power operating mode and a second reduced-power operating mode, the method comprising:
communicating with a network entity to exchange a block of data between the terminal device and the network entity while the terminal device is in the active operating mode, the block of data including data identifying a class of the terminal device;
determining when communications associated with the exchange of the block of data are complete; and
in response to determining communications associated with the exchange of the block of data are complete, switching from the active operating mode to one of the first reduced-power operating mode and the second reduced-power operating mode,
wherein the switching includes configuring the terminal device to communicate with the network entity in the first reduced-power operating mode when the terminal device is a first class of terminal device and to communicate in the second reduced-power operating mode when the terminal device is a second class of terminal device different from the first class of terminal device, and
wherein communicating in the second reduced-power operating mode includes operating in a reduced-power operating mode for a longer period of time than when communicating in the first reduced-power operating mode.

2. The method of claim 1, wherein the terminal device supports a protocol stack comprising a physical, PHY, layer, a medium access control, MAC, layer, and a radio link control, RLC, layer, and wherein determining when communications associated with the exchange of the block of data are complete is performed at the radio link control, RLC, layer.

3. The method of claim 1, wherein communicating with the network entity to exchange the block of data comprises transmitting the block of data from the terminal device to the network entity, wherein the block of data is framed or segmented into one or more uplink data units for transmission from the terminal device to the network entity.

4. The method of claim 3, wherein determining when communications associated with the exchange of the block of data are complete comprises determining when the last one of the uplink data units comprising the block of data has been transmitted to the network entity.

5. The method of claim 3, wherein determining when communications associated with the exchange of the block of data are complete comprises determining when acknowledgment signaling is received form the network entity which indicates the last one of the uplink data units comprising the block of data transmitted to the network entity has been successfully received by the network entity.

6. The method of claim 3, further comprising the terminal device conveying to the network entity an indicator to indicate an uplink data unit comprising the block of data is the last of the uplink data units comprising the block of data to be transmitted.

7. The method of claim 6, wherein the respective uplink data units comprising the block of data are associated with a header for transmission, and wherein the header for the last of the uplink data units comprising the block of data to be transmitted comprises the indicator.

8. The method of claim 7, wherein the terminal device supports a protocol stack comprising a physical, PHY, layer, a medium access control, MAC, layer, and a radio link control, RLC, layer, and wherein the indicator is provided by the radio link control, RLC, layer setting a polling bit in the header for the last of the uplink data units comprising the block of data to be transmitted to a predefined value.

9. The method of claim 7, wherein the header for an uplink data unit comprises a framing information field for indicating whether or not the uplink data unit comprises the last byte of the block of data to be transmitted, and wherein the indicator is provided by the radio link control, RLC, layer setting a value for framing information field that indicates the associated uplink data unit comprises the last byte of the block of data to be transmitted.

10. The method of claim 3, further comprising the terminal device receiving an indication from the network entity to indicate the terminal device should delay switching to one of the first or second reduced-power operating mode after the communications associated with the exchange of the block of data are complete.

11. The method of claim 1, wherein communicating with the network entity to exchange the block of data comprises the terminal device receiving the block of data from the network entity, wherein the block of data is segmented into one or more downlink data units for transmission from the network entity to the terminal device.

12. The method of claim 11, wherein determining when communications associated with the exchange of the block of data are complete comprises determining when the last one of the downlink data units comprising the block of data has been received from the network entity.

13. The method of claim 11, wherein determining when communications associated with the exchange of the block of data are complete comprises determining when acknowledgment signaling is transmitted by the terminal device to the network entity to indicate the last one of the downlink data units comprising the block of data transmitted by the network entity has been successfully received by the terminal device.

14. The method of claim 11, further comprising the terminal device determining a downlink data unit is the last of the downlink data units comprising the block of data to be transmitted by the network entity by detecting an indicator transmitted by the network entity to indicate an associated downlink data unit is the last of the downlink data units comprising the block of data to be transmitted by the network entity.

15. The method of claim 14, wherein the downlink data units comprising the block of data are each associated with a header for transmission, and wherein the header for the last of the downlink data units comprising the block of data to be transmitted by the network entity comprises the indicator.

16. The method of claim 15, wherein the terminal device supports a protocol stack comprising a physical, PHY, layer, a medium access control, MAC, layer, and a radio link control, RLC, layer, and wherein determining a downlink data unit is the last of the downlink data units comprising the block of data to be transmitted by the network entity comprises the terminal device radio link control, RLC, layer identifying that a polling bit in the header for a downlink data unit is set to a predefined value.

17. The method of claim 15, wherein the header for a downlink data unit comprises a framing information field for indicating whether or not the downlink data unit comprises the last byte of the block of data to be transmitted, and wherein determining a downlink data unit is the last of the downlink data units comprising the block of data to be transmitted by the network entity comprises the terminal device radio link control, RLC, layer identifying that a value for the framing information field indicates the associated downlink data unit comprises the last byte of the block of data to be transmitted by the network entity.

18. The method of claim 1, wherein the active operating mode is a mode in which the terminal device is configured to monitor a downlink control channel for radio resource allocation signaling from the network entity and the first and second reduced-power operating modes are modes in which the terminal device is configured to not monitor the downlink control channel for the radio resource allocation signaling from the network entity.

19. A terminal device for use in a wireless telecommunications system, wherein the terminal device is configured to selectively switch between an active operating mode and one of a first reduced-power operating mode and a second reduced-power operating mode, the terminal device comprising:
a controller unit and a transceiver unit configured to operate together to:
communicate with a network entity to exchange a block of data between the terminal device and the network entity while the terminal device is in the active operating mode, the block of data including data identifying a class of the terminal device;
determine when communications associated with the exchange of the block of data are complete; and
in response to determining communications associated with the exchange of the block of data are complete, to switch from the active operating mode to one of the first reduced-power operating mode and the second reduced-power operating mode,
wherein the switching includes configuring the terminal device to communicate with the network entity in the first reduced-power operating mode when the terminal device is a first class of terminal device and to communicate in the second reduced-power operating mode when the terminal device is a second class of terminal device different from the first class of terminal device, and
wherein communicating in the second reduced-power operating mode includes operating in a reduced-power operating mode for a longer period of time than when communicating in the first reduced-power operating mode.

20. Circuitry for a terminal device for use in a wireless telecommunications system, wherein the terminal device is configured to selectively switch between an active operating mode and one of a first reduced-power operating mode and a second reduced-power operating mode, the circuitry comprising:
a controller element and a transceiver element configured to operate together to:
communicate with a network entity to exchange a block of data between the terminal device and the network entity while the terminal device is in the active operating mode, the block of data including data identifying a class of the terminal device;
determine when communications associated with the exchange of the block of data are complete; and
in response to determining communications associated with the exchange of the block of data are complete, to switch from the active operating mode one of the first reduced-power operating mode and the second reduced-power operating mode,
wherein the switching includes configuring the terminal device to communicate with the network entity in the first reduced-power operating mode when the terminal device is a first class of terminal device and to communicate in the second reduced-power operating mode when the terminal device is a second class of terminal device different from the first class of terminal device, and
wherein communicating in the second reduced-power operating mode includes operating in a reduced-power operating mode for a longer period of time than when communicating in the first reduced-power operating mode.

* * * * *